United States Patent [19]
Wang et al.

[11] Patent Number: 5,471,671
[45] Date of Patent: Nov. 28, 1995

[54] HANSET FOR A MULTIPLE CHANNEL COMMUNICATION SYSTEM AND USE THEREOF

[75] Inventors: Zhonghe Wang, Lake Worth; Brian K. A. Johnson, Boca Raton, both of Fla.

[73] Assignee: Motorola, Inc., Schaumburg, Ill.

[21] Appl. No.: 145,115

[22] Filed: Nov. 3, 1993

Related U.S. Application Data

[63] Continuation-in-part of Ser. No. 823,531, Jan. 21, 1992, Pat. No. 5,280,630.

[51] Int. Cl.[6] .................................................. H04B 17/00
[52] U.S. Cl. ........................... 455/226.2; 455/62; 455/63; 375/224
[58] Field of Search .................................. 455/33.1, 33.2, 455/62, 63, 54.1, 54.2, 56.1, 67.1, 226.2; 375/10

[56] References Cited

U.S. PATENT DOCUMENTS

| | | | |
|---|---|---|---|
| 4,309,771 | 1/1982 | Wilkens | 375/58 |
| 4,449,223 | 5/1984 | Liskov et al. | 375/10 |
| 4,887,265 | 12/1989 | Felix | 455/54.1 |
| 5,170,485 | 12/1992 | Levine et al. | 455/54.1 |
| 5,280,630 | 1/1994 | Wang | 455/56.1 |
| 5,333,147 | 7/1994 | Nohara et al. | 375/10 |

OTHER PUBLICATIONS

Richard C. Bernhardt, "An Improved Algorithm for Portable Radio Access", Proceedings of the 38th IEEE Vehicular Technology Conference, Jun. 15–17, 1988, pp. 163–169.

Richard C. Bernhardt, "User Access in POrtable Radio Systems in a Co–Channel Interference Environment", IEEE Journal of Selected Areas in Communications vol. 7, No. 1, Jan. 1989, pagers 49–58.

Richard C. Bernhardt, "Call Performance in a Frequency Reuse Digital POrtable Radio System", IEEE Transactions on Vehicular Technology vol. 40, No. 4 Nov. 1991, pp. 74–82.

Primary Examiner—Reinhard J. Eisenzopf
Assistant Examiner—Andrew Faile
Attorney, Agent, or Firm—D. Andrew Floam

[57] ABSTRACT

A handset (24, 25) in a radio communication system (20) determines the quality of a channel (500 and 502) in response to an RSSI signal generated by a receiver (174) in combination with either an eye closure measurement (510) or a bit error rate detected by a CRC codeword in received digital information (502). The battery operated handset is also capable of conserving scanning power while operating in an area having high channel quality (520, 560, 566). The handset also has a method for determining the amount of handovers between base stations (21, 22, 23) by use of dual channel quality thresholds (582, 590) which require a higher quality threshold for establishing communication with a base station and a reduction in channel quality before a handover to a new base station.

12 Claims, 17 Drawing Sheets

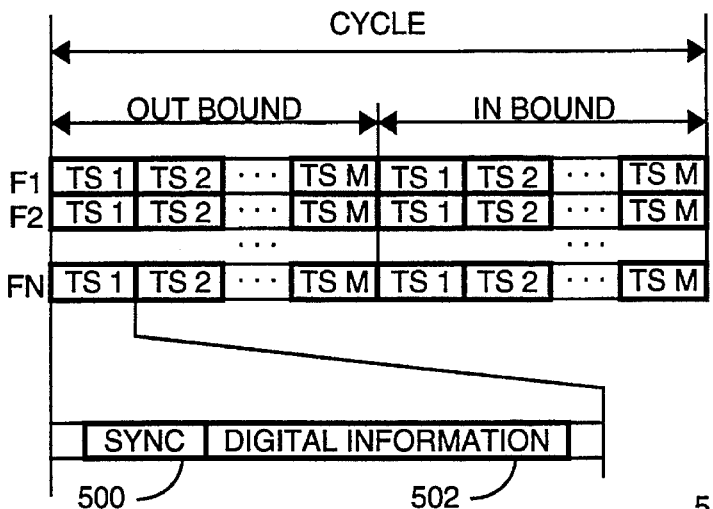
FIG. 15
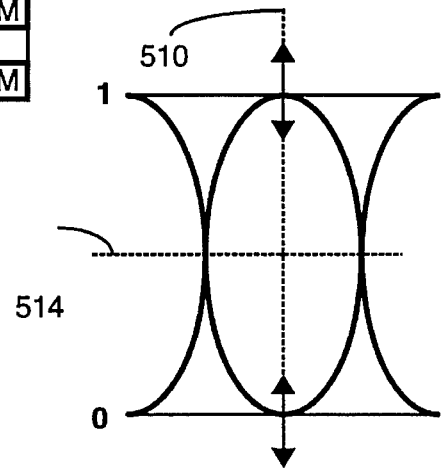
FIG. 16
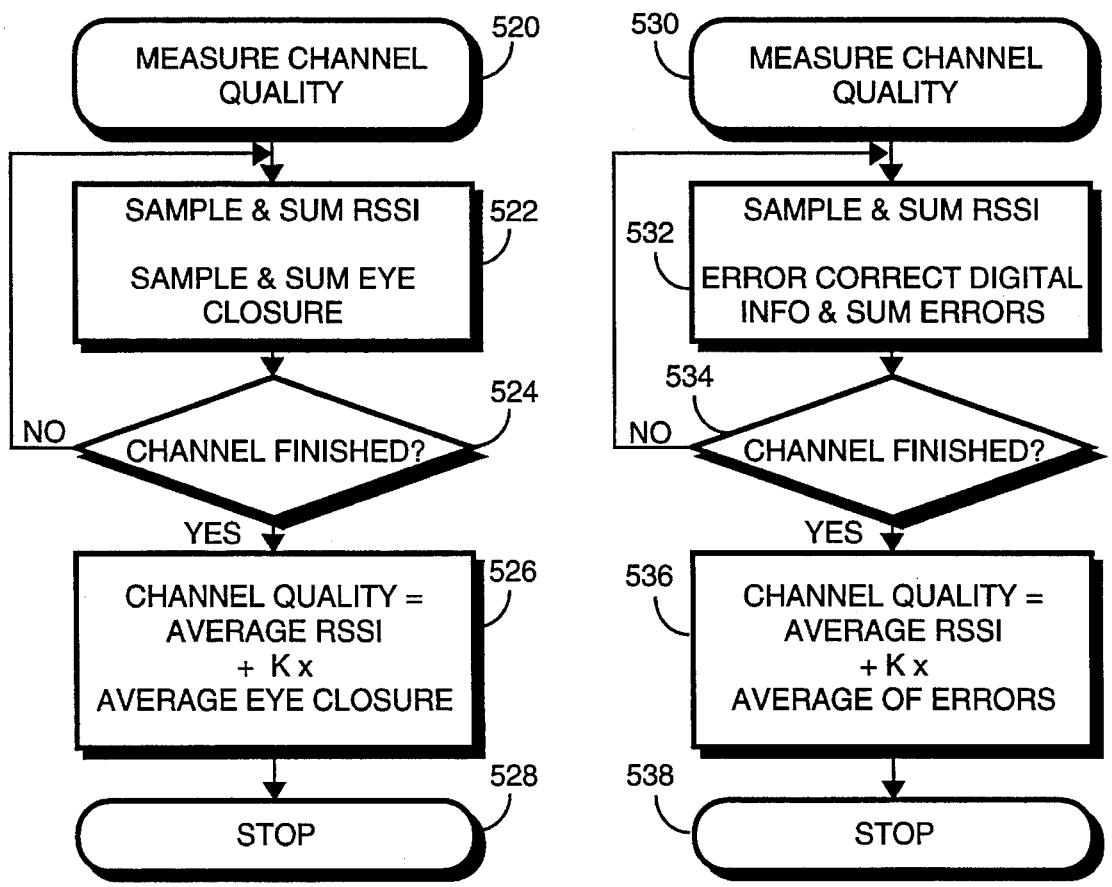
FIG. 17
FIG. 18

HANSET FOR A MULTIPLE CHANNEL COMMUNICATION SYSTEM AND USE THEREOF

This is a continuation-in-part of application Ser. No. 07/823,531, filed Jan. 21, 1992 now abandoned.

FIELD OF THE INVENTION

This invention relates in general to radio communications, and in particular to channel allocation of radio devices for two-way radio communications.

BACKGROUND OF THE INVENTION

Radio communications involves either one-way (e.g. selective call signalling or paging systems) or two-way communications (cellular, cordless telephone, or digital personal communication systems) over radio waves. Communication takes place on channels, comprising time division multiplexed (TDM) time slots or frequency division multiplexed (FDM) frequencies, or a combination thereof.

For various radio communications, fixed radio frequency spectrum are assigned. For example, in the United States, the Federal Communications Commission reserves various portions of the radio frequency spectrum to designated communication services. The radio frequency use is therefore limited to assigned services. The radio frequency use is more overtaxed within certain areas where the number of frequencies allocatable for communicating between radio transceivers in a system are severely limited.

As communication between radio transceivers is initiated, the system allocates a channel or channels for communication service therebetween. With the increase in radio communications, such as cellular and cordless telephone usage, the method for allocating channels must allocate channels utilizing the assigned frequencies in a manner to accommodate ever increasing concurrent users. Signal interference may result from multiple simultaneous usage of the same channel in neighboring geographical areas (co-channel interference) or usage of adjacent channels in the same geographical areas. The resulting interference reduces the level of system service quality. It is therefore a primary concern of the system operator to allocate channels for communication in a manner to allow the greatest efficiency of usage while reducing interference in order to maintain a certain level of service quality.

There are generally two types of channel allocation methods: fixed channel allocation and dynamic channel allocation. Fixed channel allocation methods fix the channel assignments during the entire course of operation. Since the channels are allocated only once, the fixed channel allocation method can be very time intensive and, therefore, have a good chance to provide a high level of channel reuse for any given conditions. Fixed channel allocation methods are simple and may approach being optimal in terms of channel reuse to any given traffic pattern for a given system. But the fixed channel allocation is not adaptive to a changing service environment. Also, to add or remove a base station from the system is cumbersome and fixed channel allocation methods are unable to automatically initialize the channel allocation.

Dynamic channel allocation methods, on the other hand, allocate channels in accordance with a method which is adaptive to traffic and environment changes. Since dynamic channel allocation methods do not assign channels, channels can be used in any area as needed. In addition, most dynamic channel allocation methods can initialize automatically. Unfortunately most of the existing dynamic channel allocation methods are too dynamic to have good performance in terms of channel reuse.

Secondarily, a portable handset for communication with the communication system must also determine the quality of the available channel for communicating with the base stations of the communication system. However, since the base stations may be in close proximity and using the same channels to communicate with different handsets, the determination of channel quality by simply measuring the power of a received carrier at the handset, including averaging the received signal signal power to reduce fading effects, may produce undesirable results. The carrier signal energy produced by two adjacent base stations may apparently show a good channel quality, while in reality, the interference between the two base stations may result in a low quality of reception at the handset.

Also, since the handset must be prepared to receive a call at any time, the handset must maintain its own list of available quality channels. This requires periodically scanning and determining the quality levels of the channels by the handset in order to maintain a handset channel list. However, since the handset is portable and battery powered, periodic scanning of all of the channels in order to maintain the handset channel list reduces the life of the battery of the handset.

It is preferable to maintain an optimally high quality channel interface between the handset and a base station while a call is in progress. However, if handsets were excessively engaging in a handover process between changing channel quality base stations of the communication system, the communication system would be overly burdened with base station handover information. The handover information is communicated within the system without charge to the user. Thus the expense is absorbed by the system owner and thus the system owner has reduced profitability. Furthermore, since the handover information may use the same communications links as user call conversations, the addition of the handover information to these communication links reduces the call throughput of the communication system.

Thus what is needed is a way to improve the channel quality measurement made by the handset. Also what is needed is a method of improving the battery life of the handset while scanning What is also needed is a method for regulating the amount of handovers occurring within the system. What is further needed is a method which allows for establishing a high quality channel between the base station and the handset, wherein both the handset and the base station make individual determinations on the quality of the channel and the resulting selected channel is a combination of the individual determinations.

SUMMARY OF THE INVENTION

In carrying out the objects of the present invention in one form, there is provided a portable handset transceiver for determining a quality level of a communication channel having an information signal modulated upon a radio frequency carrier for communication between the portable handset and a base station. The handset comprises a receiver for receiving the radio frequency carrier, and for generating a received signal strength indicator for determining a received signal quality level of the radio frequency carrier. The receiver further being for demodulating the information signal. And the handset further comprising a controller for determining an information quality level of the information signal, analyzing the received signal quality level and the information quality level, and generating a channel quality level signal in response thereto.

In another form, there is provided in a portable handset, a method of reducing power consumption of the handset while scanning a predetermined number of channels. The method comprising the steps of scanning and determining a quality level of each of the predetermined number of channels within a first time interval, wherein a receiver consumes a first amount of power during the first time interval, and generating a delay increase signal if at least one of the predetermined number of channels from said step (a) of scanning has a quality level above a first predetermined level. The method further comprising the step of scanning and determining the quality level of each of the predetermined number of channels within a second time interval longer than the first time interval in response to the delay increase signal, wherein the receiver consumes a second amount of power less than the first amount of power during the second interval.

BRIEF DESCRIPTION OF THE DRAWING

FIG. 1 is a diagram of a cordless telephone communication system in accordance with the present invention.

FIG. 2 is a diagram of a service area of a multiple base station cordless telephone communication system in accordance with the present invention.

FIG. 3 is a block diagram of a base station in accordance with the present invention.

FIG. 4 is a flowchart of the operation of the controller of the base station of FIG. 3 in accordance with the preferred embodiment of the present invention.

FIG. 5 is a flowchart of the operation of the channel allocator of the base station of FIG. 3 in accordance with the preferred embodiment of the present invention.

FIG. 6 is a block diagram of a cordless telephone handset in accordance with the preferred embodiment of the present invention.

FIGS. 7, 8, 9 are flowcharts of the operation of the controller of the handset FIG. 6 in accordance with the preferred embodiment of the present invention.

FIG. 10 is a flowchart of the operation of the call initiation routine of the controller of the handset FIG. 6 in accordance with an alternate embodiment of the present invention.

FIGS. 11, 12, 13, and 14 are flowcharts of the operation of the channel allocator of the base station of FIG. 3 in accordance with a second embodiment of the present invention.

FIGS. 15 through 20 show various aspects of a second embodiment for the handset of FIG. 6.

FIG. 15 shows a channel matrix of the dynamic channel assignment system operating in accordance with the preferred embodiment of the present invention.

FIG. 16 shows an idealized eye pattern of a two level FM signal operating in accordance with the preferred embodiment of the present invention.

FIG. 17 shows flow chart of a first method for determining channel quality.

FIG. 18 shows flow chart of a second method for determining signal quality.

FIG. 19 shows a flowchart for reducing power consumption while for maintaining a handset channel list.

FIG. 20 shows a flow chart of a handset initiating a call and maintaining the call during a handover environment.

DETAILED DESCRIPTION OF THE INVENTION

I. A First Embodiment of the Communication System

The present invention is applicable to all forms of radio communication, such as cellular radio telephone systems or cordless telephone systems, which have a need to allocate communication channels to users. The preferred embodiment of the present invention is described herein in reference to a cordless telephone system operating in accordance with the Digital European Cordless Telephone (DECT) specification.

Figure 1:
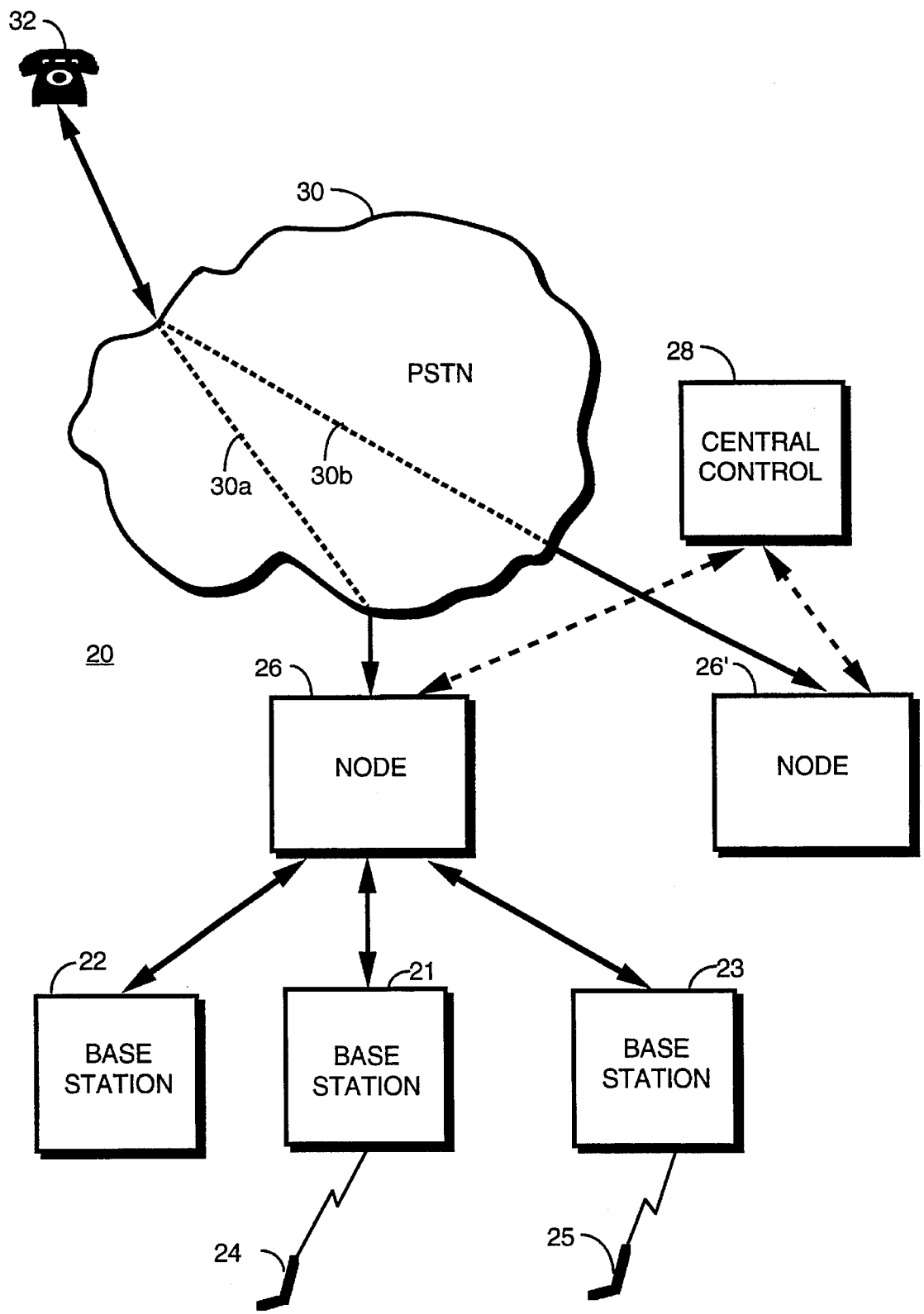
FIGS. 1 through 14 show a first embodiment of the present invention.

Referring to FIG. 1, a DECT system 20 comprises telepoint base stations, such as 21, 22, or 23, designed for inbound or outbound calling to or from handsets, such as 24 or 25. The base stations 21, 22, or 23 are coupled to a node 26 for coupling base stations into a cluster for covering a localized area such as an office building or a shopping mall. The nodes 26, 26' may be coupled to a central network control 28 for operation of a radio communication system. The nodes 26, 26' are coupled to the public switched telephone network 30 through which calls are routed to or from a conventional telephone 32 via connections 30a or 30b established through the public switched telephone network 30. When a caller calling from a handset 24 or 25, wants to place a call, a radio communications link is formed with a base station 21, 22, or 23 and the call is connected to the conventional telephone 32 via the node 26 and the connection 30a. When a caller, calling from a conventional telephone 32, wishes to reach a particular handset subscriber, the caller places a call through a connection 30a established through the public switched telephone network 30 to a node 26. The node 26 instruct the base stations 21, 22, and 23 to page for the handset. The handset responds to the page by signalling the base station 21 in order to couple the handset 24 to the telephone 32.

Channel allocation, whether the call is outbound from the cordless telephone handset or inbound thereto, is handled by each base station 21, 22, or 23. A handset 24 attempts to establish communication with the base station 21, 22, or 23 having the strongest signal at the handset 24. Once communication is initiated between the handset and a base station, the base station 21, 22, or 23 allocates at least one communication channel to the handset 23, 24, or 25. The channel is allocated in accordance with the preferred embodiment of the present invention by selecting a channel from a Preferred Channel List (PCL) as described below. The PCL is maintained at each base station 21, 22, or 23, independently, allowing fully distributed channel allocation throughout the system, therefore not overburdening a node 26 or the central control 28.

Figure 2:
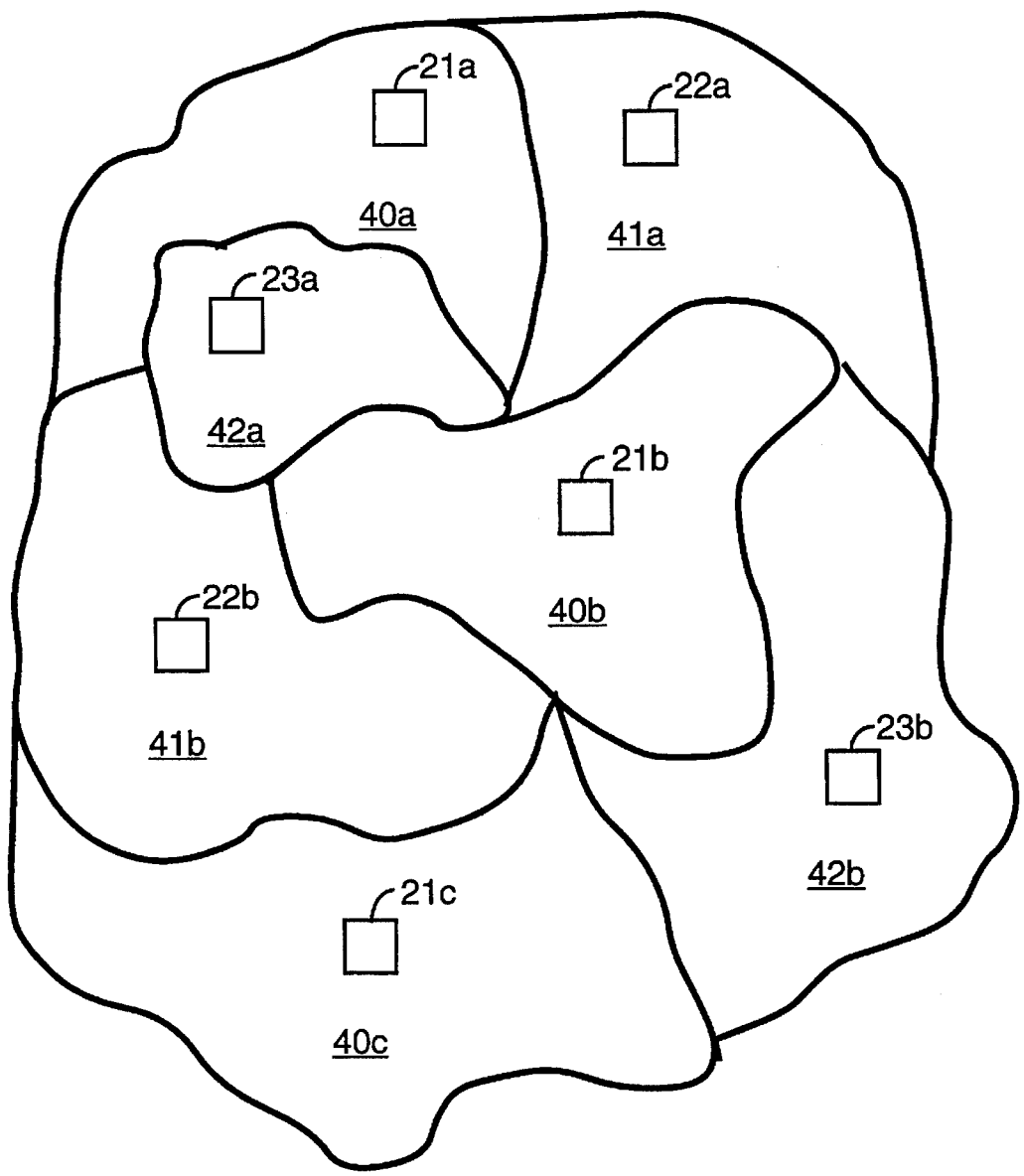

Referring to FIG. 2, each base station 21a–c, 22a–b, and 23a–b, has an associated coverage area 40a–c, 41a–b, and 42a–b, respectively. For example, base station 21b will provide communications for any handset within coverage area 40b. The coverage area provided by a base station may vary based upon materials forming the environment in the coverage area. In cordless telephone systems, the base stations are preferably positioned to form coverage areas such that a cluster of base stations cover a designated area such as a shopping mall, an airport, an office complex, or a designated geographic area. When allocating channels for use and assigning channels to the handsets as requested, the base station 21b considers the history of channel quality for channels used in the area 40b, as described below.

Figure 3:
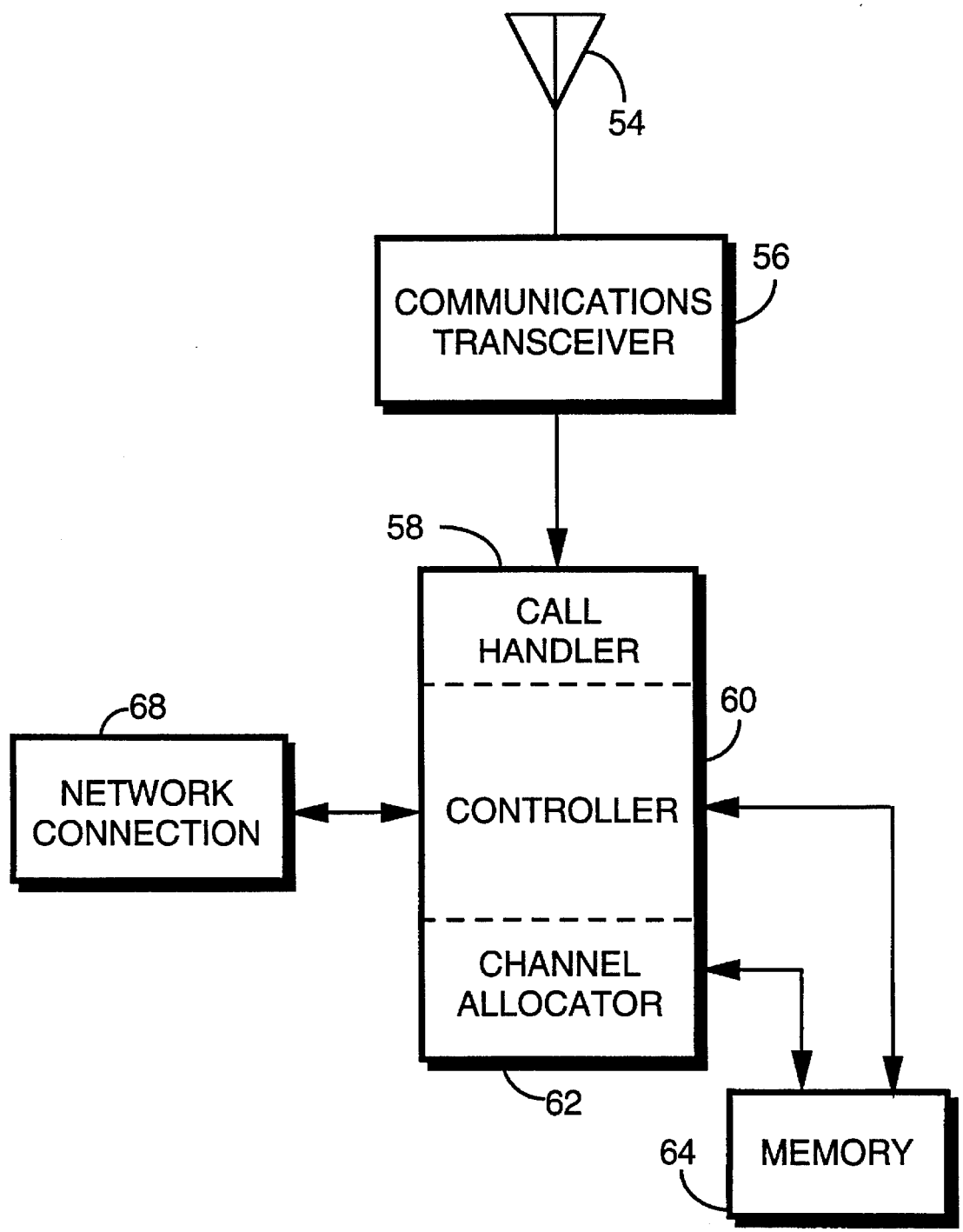

Referring to FIG. 3, a block diagram of a base station 21 in accordance with the present invention is shown. Radio communication with the base station is provided by an antenna 54 and a conventional communications transceiver 56. The communications transceiver is coupled to a call handler block 58 of a controller 60. The call handler block 58, in accordance with the present invention, receives the call initiation requests, transmits the allocation of communication channels to handsets, and maintains the channel for communication with the handset until the service or call is disconnected.

The controller 60 controls the operation of the base station 21 for all operations. The controller 60, in accordance with the present invention, also comprises a channel allocator block 62 for allocating channels. The controller 60 and the channel allocator 62 of the preferred embodiment of the present invention are coupled to a memory 64 for accessing and maintaining information on the system's channels. In accordance with the preferred embodiment of the present invention, a Preferred Channel List (PCL) is stored therein. The PCL is a list developed from all of the channels available to the system. Each base station typically uses only a subset of the channels available to the system. The controller 60 maintains the PCL by measuring and recording a history of channel quality measurements as explained below.

In accordance with an alternative embodiment of the present invention, an assigned channel list and a borrowed channel candidate list are stored in the memory 64. The controller 60 is coupled to the node 26 and may allow communication with the node 26 or the network center 28 (FIG. 1) via a network connection 68 for maintenance of the assigned channel list and the borrowed channel candidate list stored in the memory 64.

Figure 4:
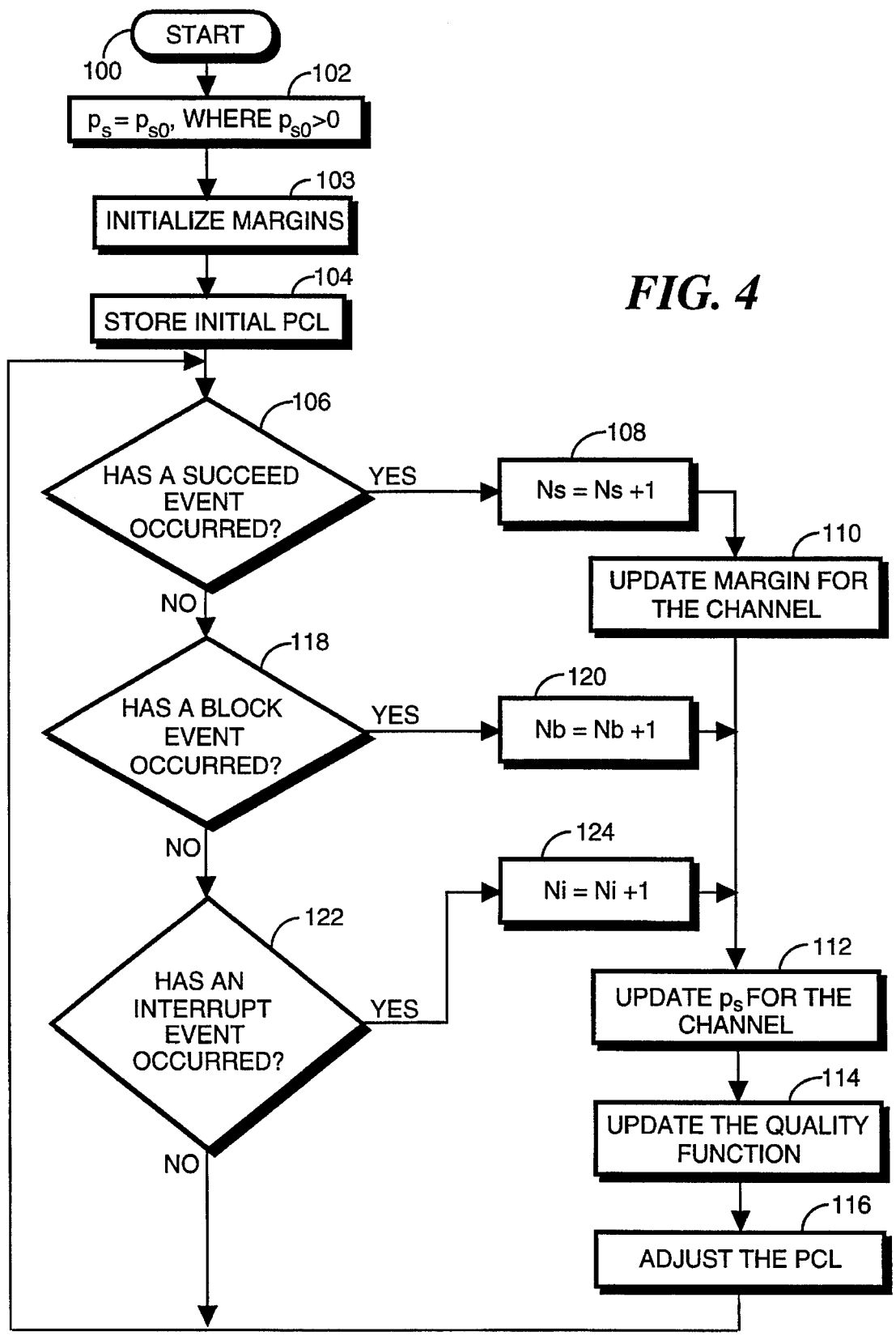
Figure 5:
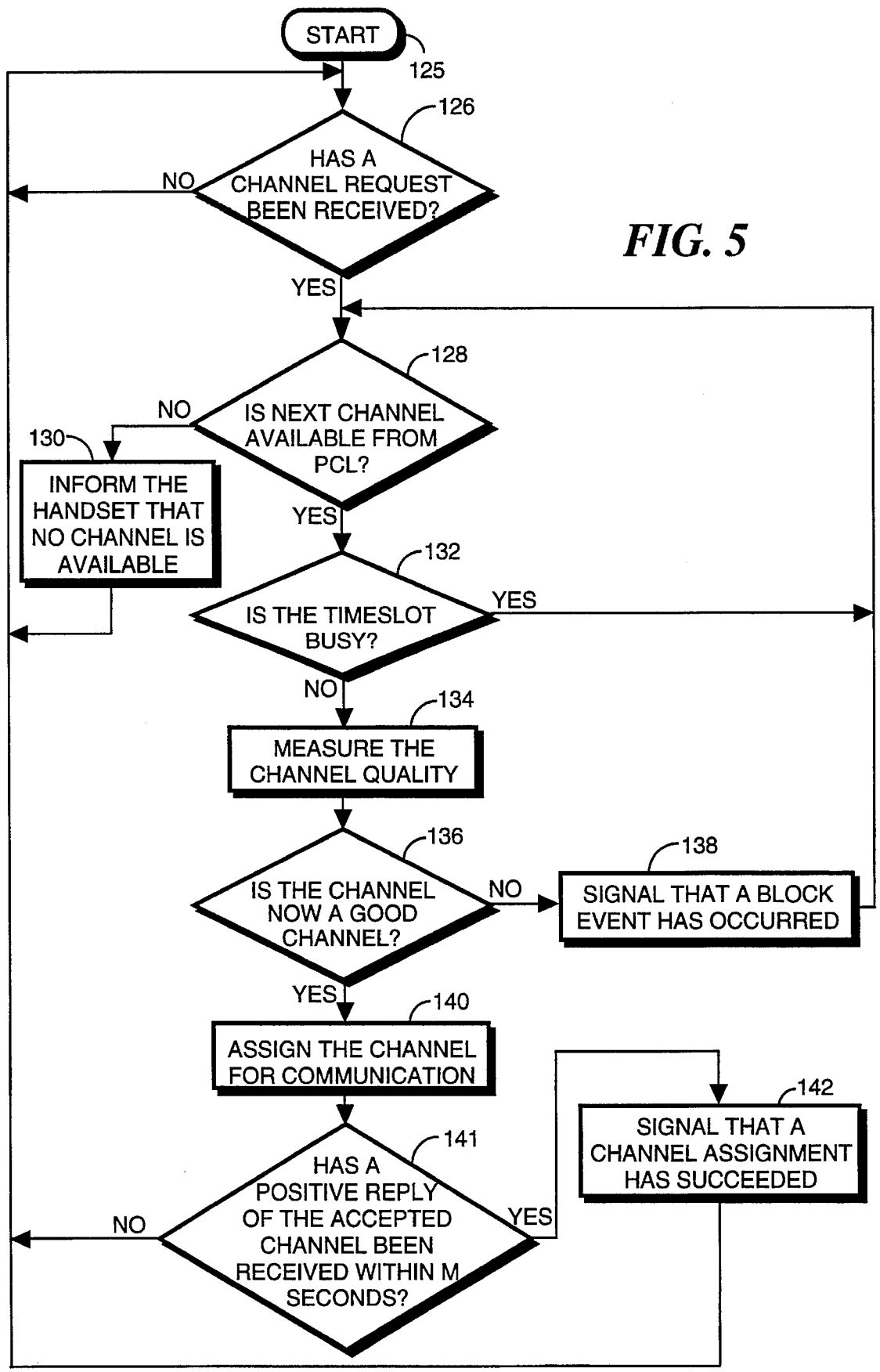

Referring to FIGS. 4 and 5, the channel allocation method of the preferred embodiment of the present invention is described. The fully distributed dynamic channel allocation method of the present invention combines the advantages of the fixed and dynamic channel allocation methods. For example, the method of the present invention has channel allocation initialization and is adaptive to a slowly changing environment like the dynamic channel allocation methods. In addition, in heavy traffic the distributed dynamic channel allocation method of the present invention simulates an optimal fixed channel allocation method in the sense that the method provides an improved compact layout of channel reuse. Since all the decisions are based on local measurements at the base station, the channel allocation method of the preferred embodiment of the present invention is simple and fully distributed in the sense that no direct connection between base stations is necessary. This allows for independent operation by each base station and does not burden the nodes 26 or the central network control 28 (FIG. 1) for channel allocation.

The measurements made by the base stations concern the quality of a channel in the system. The quality is described by a function $f$ describing successful channel service, where a channel service is defined to be successful if it is neither blocked nor interrupted. For example, $$f\ (p_s, \text{Margin}, cq)$$

where $p_s$ is the probability of success or P(success); Margin is Equality>Threshold$^{(quality-Threshold)}$, that is, Margin is the mean value of (quality−Threshold under the condition of quality>Threshold, where quality is any measurement defined by the system;

Threshold is the lower bound of the quality for a channel to be considered as a good channel;

and cq is the current channel quality.

The requirements for the quality function are that it should be an increasing function of $p_s$ and cq and a decreasing function of Margin. The definition of the quality function for a channel ($f$) in accordance with the preferred embodiment of the present invention is:

$$f(p_s, \text{Margin}, cq) = p_s \times \text{Margin}^{-L} \times cq^N =$$

$$\frac{N_s}{N_s + (M \times N_i) + N_b} \times \text{Margin}^{-L} \times cq^N$$

where

L, M, N: weights defined by the system, for example L=4.0, M=10, and N=1.0;

$N_s$: number of successful calls;

$N_b$: number of blocked calls; and $N_i$: number of interrupted calls.

The method of channel allocation of the preferred embodiment of the present invention allocates channels with a combination of a high probability of success and a low probability of being blocked or interrupted. This is accomplished by defining $p_s$ to include not only the effects of the number of successfully completed calls and number of blocked calls but also the effect of the number of interrupted calls with an assigned weight M. Preferably M is set equal to 10, thereby weighting the occurrence of interrupted calls ten to one over blocked or successful calls. In addition, the method of the preferred embodiment of the present invention advantageously allocates channels with a low margin and a high channel quality. The lower margin preferably allocates channels not too good, that is, channels usually operating at the quality approaching the threshold from above.

In accordance with the preferred embodiment of the present invention, each base station in the system maintains a Preferred Channel List (PCL). The channels are listed in a decreasing sequence of the values of their quality function. The channel quality of the channels for a base station will be updated whenever any of the following three recordable events happens: (a) a service (e.g., a call) is finished successfully; (b) a service is interrupted; or (c) a channel is rejected for service initiation due to bad quality (i.e. blocked). The PCL is maintained in memory 64 (FIG. 3) of each base station 21. The controller 60 (FIG. 3) of the base station updates the Preferred Channel List (PCL) while the channel allocator 62 (FIG. 3) utilizes the PCL for allocating channels in response to service initiation requests.

Referring to FIG. 4, the PCL updating process of the base station controller 60 in accordance with the preferred embodiment of the present invention is shown. When a base station is first installed in the system 100 it assigns an initial probability $p_{s0}$ greater than zero to $p_s$ (i.e., $p_s=p_{s0}>0$) 102 and the Margins are initialized 103. The initial probability of success ($p_{s0}$) is a parameter that affects the grade of service of a base station when the base station is in its initialization stage. If the $p_{s0}$ is assigned a small value the un-used channel will not be used unless the grade of service of the used channel degrades a great amount (i.e., dropping lower than $p_{s0}$). The assignment of the initial value of $p_s=p_{s0}>0$ makes the value of the quality function of the used channel and that of the un-used channels comparable. From the definition of the quality function we see that the quality function is only meaningful for used channels having a quality function $f(p_s, \text{Margin}, cq) > 0$. By assigning $p_s = p_{s0} > 0$, for example 0.5, an un-used assigned channel will be considered for allocation before a used channel only if the un-used channel has a higher quality value than that of the used channel. In case the initial value of the channel is assigned $p_s = p_{s0} = 0$ the un-used channels would never be considered because the quality value of the used channel would always be higher than that of the un-used channels. The Margins are also initialized 103 to equal values. The initial PCL is then formed by randomly positioning the channels of the system and stored 104.

Processing then awaits the occurrence of one of the three recordable events on a channel: (a) a call on the channel is finished successfully 106; (b) an initiation request on the channel is blocked 118; or (c) a call on the channel is interrupted 122. The channel allocator 62 signals the controller 60 that a block event has occurred 118 when a call initiation request is blocked. The call handler 58 follows the progress of a call on a channel and signals the controller 60 that a succeed event has occurred 106 upon successful completion of the call. And the call handler 58 signals the controller 60 that an interrupt event has occurred 122 when the call handler 58 is signalled by the handset that the call is interrupted.

If a succeed event on a channel has occurred (i.e., a call on the channel is finished successfully) 106, the success event counter, $N_s$, for that channel is incremented by one 108 and the Margin for that channel is updated 110. Previous proposals for using a channel with a measured Margin use an instantaneous value for the Margin which is only updated when needed, i.e., at the call setup stage. The method of the present invention, though, updates the Margin 110 after each successful completion of a call 106, thereby utilizing a more meaningful Margin based on the history of the channel. The Margin being updated after each successful call realizes a mean Margin value which advantageously improves the concept of Margin over the prior instantaneous margin measurement. Also, the margin value after a successful call is a truer measurement of channel Margin than the margin measured at call connection setup.

After updating the Margin 110, the probability of success, $p_s$, for the channel is then updated 112 and the quality function, $f$, for the channel is updated 114. The Preferred Channel List (PCL) is adjusted 116 in accordance with the updated quality function, $f$, value. For example, the success event could increase the quality function for the channel and may allow the channel to move to a higher position in the PCL.

After adjusting the PCL 116, processing returns to await occurrence of one of the three recordable events 106, 118, or 122. If a block event on a channel has occurred 118, the block event counter $N_b$ for that channel is incremented by one 120. The probability of success $p_s$ for the channel is then updated 112, the quality function $f$ for the channel is updated 114, and the PCL is adjusted 116 in accordance with the updated quality function value. Likewise, if an interrupt event on a channel has occurred 122, the interrupt event counter $N_i$ for that channel is incremented by one 124, the probability of success ($p_s$) for the channel is updated 112, the quality function ($f$) for the channel is updated 114, and the PCL is adjusted 116. After each adjustment of the PCL 116, processing returns to await occurrence of one of the three recordable events 106, 118, or 122.

In this manner, a current Preferred Channel List (PCL) is maintained wherein the channel with the highest value of the quality function measured on past history is at the top of the PCL. The other channels are positioned in the PCL at ever decreasing values of the quality function measured. As stated above, the channel allocation method of the preferred embodiment of the present invention is fully distributed in that each base station stores a PCL in its memory 64 (FIG. 3) and the controller 60 maintains, or updates, the PCL as events occur.

Referring to FIG. 5, the operation of the channel allocator 62 of the base station 21 of FIG. 3 in accordance with the preferred embodiment of the present invention is shown. The method for channel allocation of the present invention attempts to assign the channel with the best quality (i.e., the channel with the highest value of the quality function) whenever possible. The allocated channel would be the first channel in the Preferred Channel List (PCL) that is in a free time slot (in the case of one transceiver per base station) and currently in good quality. Alternatively, channel allocator 62 could allocate a number of channels in good quality as a list of channels is decreasing preference to the base station (an allocated channel list, ACL), from which the handset would choose the first acceptable channel and identify to the base station the acceptable channel.

After the base station is put into service 125, the channel allocator 62 awaits a request for a channel assignment 126. When a channel assignment request has been received 126, the PCL is examined to determine if the next free (e.g., first) channel on the PCL is available 128. If there are no free channels available for allocation 128, the channel allocator 62 signals the controller 60 to inform the handset that no channel is available for allocation 130 and processing awaits the next channel assignment request.

If a free channel on the PCL is available for allocation 128, it is determined whether the time slot for the channel is busy 132 (assuming there is one transceiver 56 per base station (FIG. 3)). If the channel's time slot is busy 132, the PCL is examined to determine if another free channel on the PCL is available for allocation 128. If the channel's time slot is not busy 132, the current channel quality cq is measured 134 and it is determined from the channel quality measurement whether the channel is now a good channel 136. Though the channel may occupy a high position in the PCL because it had previously been measured as a good channel, the channel may not now be a good channel. If the channel is not now a good channel 136, the channel allocator 62 signals the controller 60 that a block event for the channel has occurred 138 and the next free channel on the PCL is examined to determine if it is available 128. If, on the other hand, the channel is measured as a good channel 136, the channel is assigned for communication 140. As mentioned above, the channel allocator could perform a number of iterations of measuring channels to derive a predetermined number of good channels (such as four) and inform the handset of the good channels in decreasing preference (the ACL) 140. Processing awaits a reply from the handset for a predetermined time, M seconds 141. If a positive reply from the handset is received identifying an acceptable channel within M seconds, the channel accepted by the handset is utilized for communication and the channel allocator 62 signals the controller 60 that a channel assignment (i.e., a channel initiation request) has succeeded 142. Processing returns to await the next channel assignment request 126. If a positive reply is not received within M seconds 141, processing returns to step 126.

In this manner, the PCL is utilized to allocate channels for communication. The method of channel allocation of the present invention utilizes the mean Margin as a parameter of the quality for a channel. This parameter makes possible optimizing channel reuse in a distributed fashion. More particularly, taking the mean Margin as a parameter of the quality function, a channel with a lower mean Margin has a higher priority over channels with higher mean Margins, leading to better channel reuse. The improved channel reuse is a result of the relationship that the smaller the mean Margin, the more compact the layout of the co-channels will be and, consequently, the higher the channel reuse. Previous proposals for using a channel with a small Margin use an instantaneous value for Margin which is only measured at the call initiation stage. Due to shadowing and fading effects and its vague meaning, an instantaneous value for Margin is almost meaningless. The method of the present invention, though, uses a mean Margin which is updated after each successful completion of a call, thereby utilizing a more meaningful mean Margin based on the history of the channel.

Figure 6:
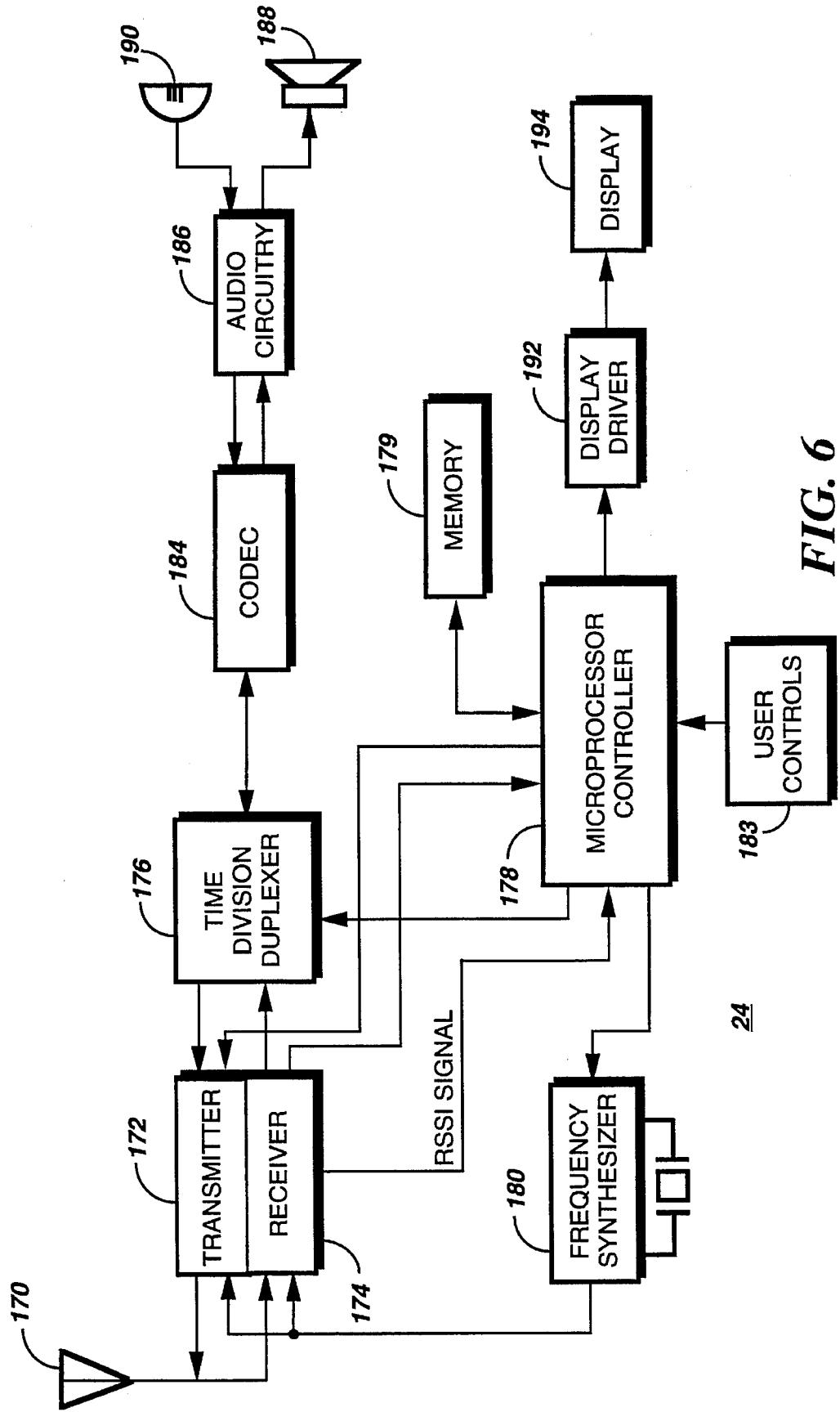

Referring to FIG. 6, the handset 24 of the DECT system 20 (FIG. 1) comprises an antenna 170 coupled to a transmitter circuit 172 and a receiver circuit 174. The microprocessor controller 178 receives a signal from the receiver circuit 174 indicating the received signal strength (the RSSI signal).

A time division duplexer 176 controls the signal provided to the transmitter 172 and received from the receiver 174 to facilitate two-way communications by synchronizing communications to the time slot allocated for communications. The operation of the timed division duplexer 176 is controlled by a signal from the microprocessor controller 178. The microprocessor controller 178 provides a signal to a frequency synthesizer 180 for controlling the operation thereof. The frequency synthesizer 180 supplies the operating frequency information to the transmitter 172 and the receiver 174 for modulation and demodulation of the communication signal. The controller 178 is also coupled to a memory 179 for accessing and updating stored information.

The signal received by the receiver 174 or transmitted by the transmitter circuit 172 is a digitally encoded signal which passes through a codec 184 for digital-to-analog or analog-to-digital conversion. The signal received via the receiver circuit 174 and converted by the codec 184 is supplied as an analog signal to audio circuitry 186 and thence to a speaker 188. Likewise, an analog signal received from a microphone 190 passes through the audio circuitry 186 and is converted to a digital signal by the codec 184 before being provided to the transmitter circuit 172. In addition, control signals, such as call initiation requests and call disconnect requests, can be provided from the controller 178 to the transmitter 172 for transmission therefrom. Control signals received by the receiver 174 are likewise provided to the controller 178.

For other operations, such as dialling up a telephone number, user controls 183 provide appropriate signals to the microprocessor controller 178. In addition, the microprocessor controller 178 supplies a signal to a display driver 192 for generation of a visual message for presentation to the user on a display 194.

Figure 7:
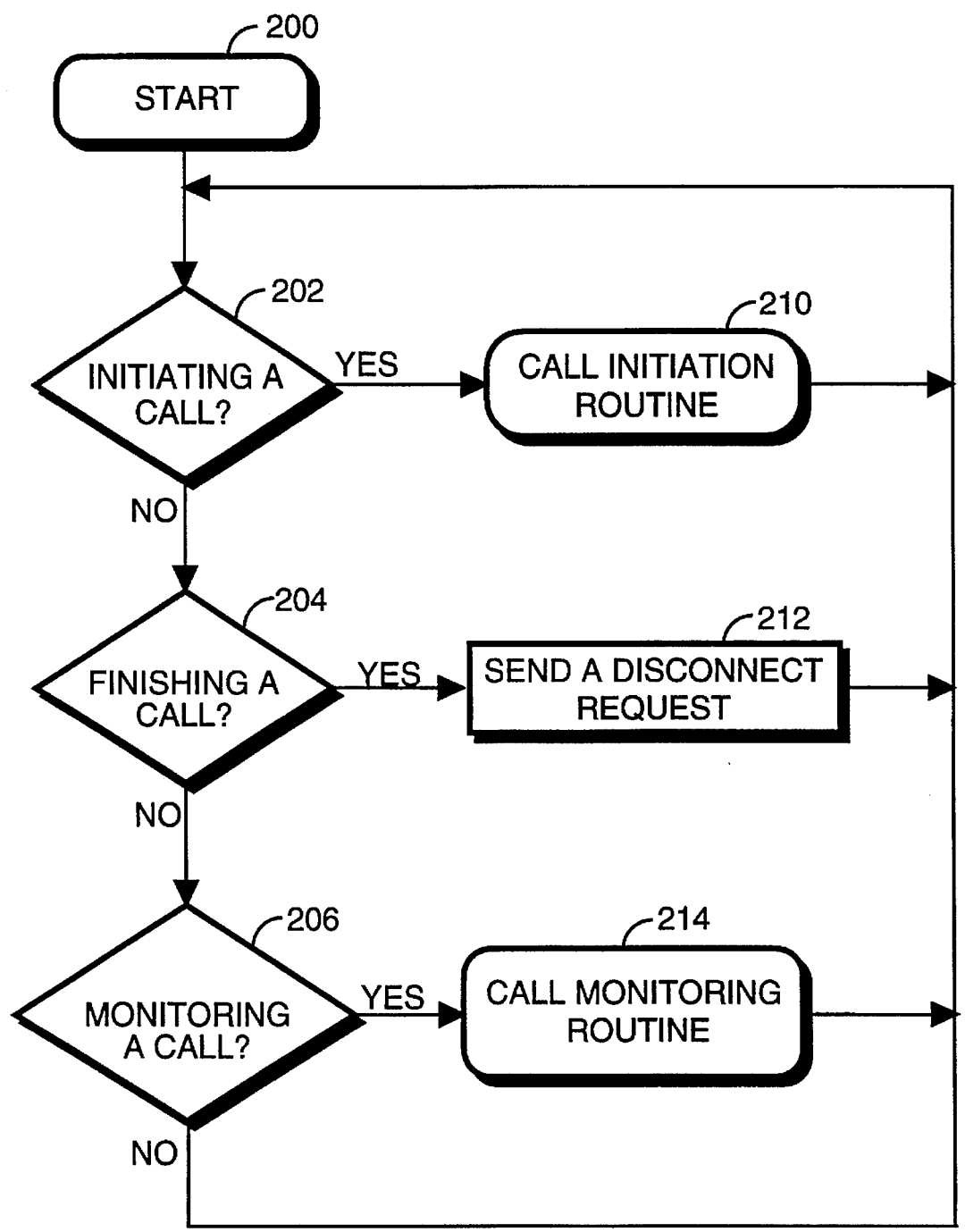
Figure 8:
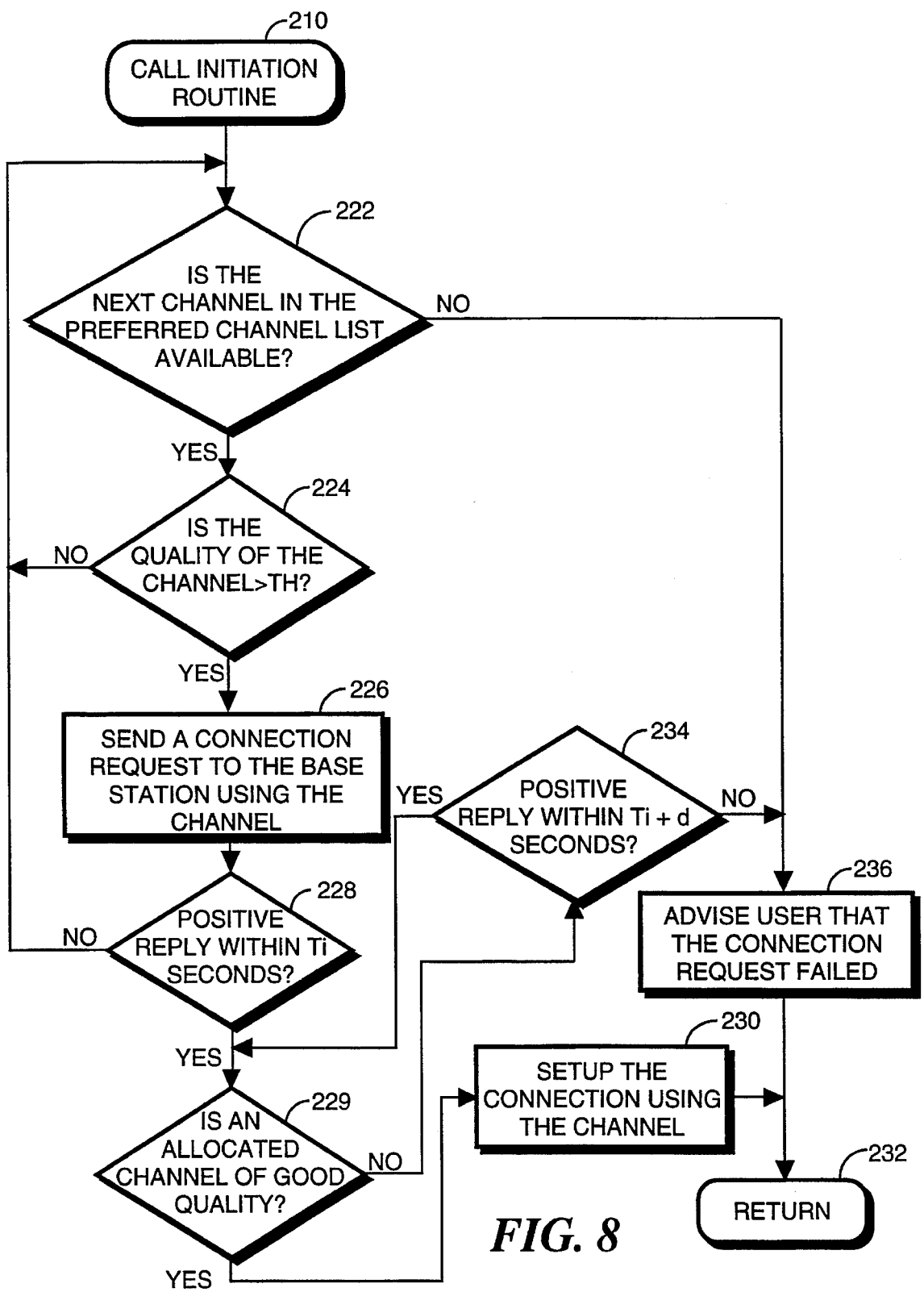
Figure 9:
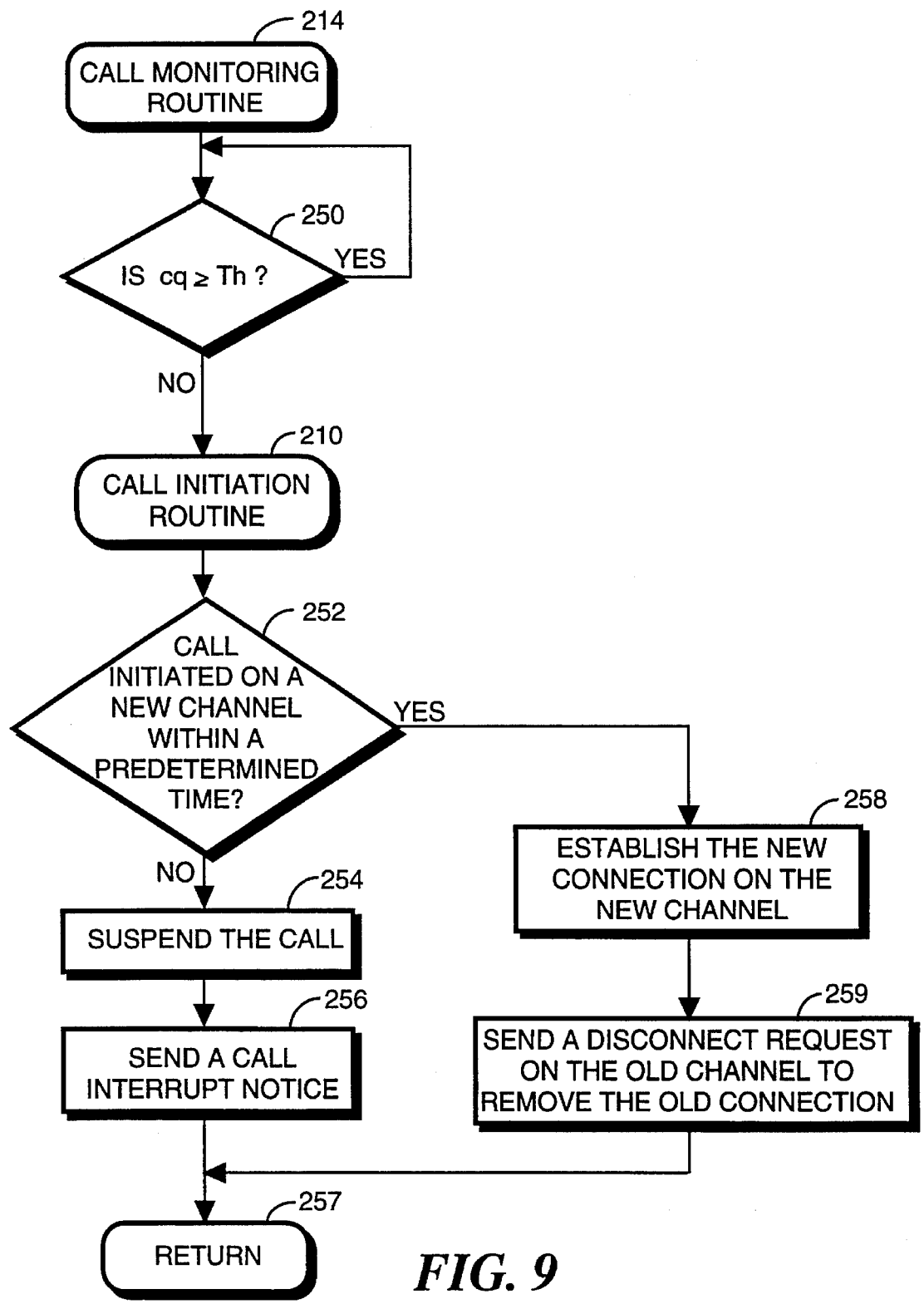

Referring to FIGS. 7, 8, and 9, a flow chart of the operation of the controller 178 of the handset 24 (FIG. 6) is shown. Referring to FIG. 7, the process of the controller 178 (FIG. 4) starts 200 with the power up of the handset. The controller can perform three functions while interfacing with a base station: initiate a call 202 between the handset and the base station, finish a call 204, and monitor a call 206. If the controller 178 is requested to initiate 202 a call, a call initiation routine 210 is performed, after which processing returns to await the next calling task request 202, 204, 206. If call finishing 204 is detected, the handset sends a disconnect request 212 to the base station after which processing returns to the idle loop to await one of the calling task requests. Finally, if call monitoring 206 is detected, a call monitoring routine 214 is performed, after which processing proceeds to await the next calling task request 202, 204, 206. If none of the calling task requests are received, processing remains in an idle loop 202, 204, 206 awaiting one of the calling task requests.

Referring to FIG. 8, before the call initiation routine 210 begins, the handset locks to a base station and learns the Preferred Channel List (PCL) of that base station. The handset could lock to the base station by taking a quality measurement of a channel broadcast by the base station, such as measuring the RSSI value (proportional to the power of the signal broadcast by the base station) or calculating a signal to noise and interference ratio (S/I). The Preferred Channel List (PCL) of the base station is downloaded into the memory 179 (FIG. 6). The handset monitors the environment by regularly scanning channels to lock to the strongest base station. The base station broadcasts its PCL on its channel regularly or on demand. Thus, the handset is locked to a base station and knows the PCL of the base station before call initiation 210.

First, the Preferred Channel List (PCL) of the selected base station is examined to determine if the next (e.g., first) channel in the PCL is available 222. If a channel is available from the PCL 222, the quality of the channel is measured to determine if the channel quality is above a threshold Th 224. If the channel quality is not above the threshold Th 224, the next channel in the PCL is selected, if available 222. If the channel quality is above the threshold Th 224, a connection request is sent to the base station using the channel 226. If a positive reply is not received from the base station within a predetermined time period Ti 228, the next channel in the PCL is selected, if available 222. If a positive reply is received from the base station within Ti seconds 228, the channel quality of the allocated channel is measured to determine if it is a good channel 229. If the allocated channel is a good channel 229, a communication connection (i.e., radio link) is setup between the handset and the base station using the channel 230 and processing returns 232 to await the next calling task request 202, 204, 206.

If the allocated channel is not good 229, processing awaits reception of a positive reply from the base station for Ti+d seconds 234 indicating an additional allocated channel. If a positive reply is received within Ti+d seconds 234, the channel quality of the additional allocated channel is measured to determine if it is a good channel 229. If a positive reply is not received within Ti+d seconds 234, the user is informed that the channel connection request failed 236 (i.e., no channel is available for allocation from the selected base station) and processing returns 232 to await the next calling task request 202, 204, 206. Also, when there are no channels available for allocation 222, the user is informed that the channel connection request failed 236 and processing returns 232 to await the next calling task request 202, 204, 206.

Referring next to FIG. 9, the call monitoring routine 214 is shown. While a call is in progress 214, the channel quality is monitored by the controller 178 (FIG. 6) to determine whether the channel quality has become poor for continued use 250. The channel quality is poor when the quality falls below a threshold Th 250. When it is determined that the channel quality has fallen below the threshold 250, the call initiation routine 210, as described above, is accessed. If a call is not successfully initiated within a predetermined time 252, the user is notified that the call is suspended 254 and a call interrupt notice is sent to the the base station 256 for maintaining the Preferred Channel List, as described above. Processing returns 257 to the idle loop 202, 204, 206 (FIG. 7) to await one of the calling task requests.

If a call is successfully initiated on another channel 252, a "handover" is performed, handing the call over from one channel to another. A new connection is established between a base station and the handset on the new channel 258. A disconnect request is sent on the old channel 259 to remove the old connection. Processing then returns 257 to the idle loop 202, 204, 206 (FIG. 7) to await one of the calling task requests.

The preferred embodiment of the present invention is an apparatus and method for fully distributed dynamic channel allocation. An alternate method for channel allocation utilizing the present invention is an optimal dynamic channel allocation. The alternate method of channel allocation described herein combines fixed channel allocation and dynamic channel allocation and optimizes channel reuse by keeping the reuse distances (i.e., the distances between co-channel base stations) as small as possible with respect to the changing environment. The channel allocation method allows channel borrowing functions under light traffic. In heavy traffic, the alternate method described hereinbelow approaches an optimal fixed channel allocation method with a compact layout of channel reuse in respect to a slowly changing environment. In the channel allocation adjustment process described herein, a meaningful measurement of the channel quality is the S/I measured when all the first tier co-channels are busy. The concept of locally heavy loaded periods is introduced to allow meaningful measurement of the channel quality. The locally heavy loaded period of channel i is detected either by local measurement of the environment (a distributed version) or by receiving messages from a center (a central control version) such as the network center 28 (FIG. 1).

At any one time, a subset of the channels available to the system are used by a base station. These channels are "assigned" to the base station and the base station is the "home site" of these channels. The criteria for improved channel allocation in accordance with the method of the present invention is that channel i will be "assigned" to site j if channel i offers guaranteed quality of service to site j unless some other site borrows it, and site j has the most efficient usage of channel i at the particular time period.

In the alternate embodiment, the quality of a channel is measured by the signal to noise plus interference ratio (S/I). The minimum required quality for the channel to be used is defined by the threshold— Th. A channel is found to be in poor quality if S/I<Th. A channel is perfect if $0 \leq S/I - Th \leq \epsilon$ where $\epsilon$ is a given constant which defines the sensitivity of the channel allocation method. A channel is found in too good quality if S/I>>Th.

Making channel allocation decisions based on the measurement of S/I in accordance with the present invention results in advantages over systems that make decisions based on a deductive method. For example, the method of the present invention is simple, accurate, and effective. Though S/I measurement is simple, the S/I may have a vague meaning: e.g., if S/I is too good the reason may be either all of the co-channels are not busy or all of the co-channels are too far away; or if the S/I is poor the reason may be some other site is borrowing the channel or some co-channel sites are too close. The vague meaning of S/I indicates that a channel allocation method based solely on a single measurement of S/I will lead to poor performance. The channel allocation method of the present invention, therefore, is concerned with a worst case S/I measurement. The worst case S/I of channel i, $SI_w(i)$, occurs when all the main co-channels (first tier) of channel i are in use. $SI_w(i)$ can be derived from m independent measurements ($m \geq 1$), where the probability, $p_s/I$, that the worst case S/I cannot be found in m independent measurements is a function of the mean idle-to-busy ratio:

$$P_{S/I} \leq \left( 1 - \frac{1}{(1+r)^n} \right)^m$$

where n is the number of co-channels; and $r = \max_k(E_k(I_i)/E_k(B_i))$, where k designates the co-channel base stations.

The present invention advantageously utilizes the measurement S/I with the concept of locally light or locally heavy loaded periods to optimally allocate channels. A channel i at site j can be said to be in a locally heavy loaded period if all the important interference, the prime co-channels (which are defined for simplicity as the first tier co-channels) are busy. When not locally heavy loaded, a channel is considered locally lightly loaded.

If a measurement S/I is too good in locally heavy loaded period we are still not quite sure if the quality of the channel is really too good. The problem is solved by taking m independent measurements during the locally heavy loaded period. The quality of the channel is described by the worst signal-to-noise ratio of channel i, $SI_w(i)$, among the m measurements, which greatly increases the creditability of the measurement.

$$SI_w(i) = \min_{l \in L}(S_l(i)/I_l(i))$$

where L is a set containing the last m measurements measured after the channel is found to be in a locally heavy loaded period.

Channel borrowing is allowed in locally light loaded periods, but is not allowed in locally heavy loaded periods. By allowing channel borrowing only in locally light loaded periods and the channel allocation adjustment process only in locally heavy loaded period, the vagueness of the meaning of S/I is removed. For example: if S/I is found in poor quality in a locally light loaded period, the measurement means that an adjacent base station is borrowing the channel (co-channel interference in a light loaded period is not a concern). If S/I is found poor in a locally heavy loaded period, the measurement means that some co-channel site is too close since channel borrowing in accordance with the present invention is not permitted in locally heavy loaded periods.

Each base station in accordance with the alternate embodiment of the present invention performs a channel assignment adjustment whereby a channel is removed from a base station's list of assigned channels. Whenever, in the channel assignment adjustment process, a channel in a locally heavy loaded period is found to be poor, a replacement "home site" for the channel may be found. The new "home site" should have a better quality (S/I≧Th) or a more efficient use of the channel. A channel is poor if $SI_w(i)$ is less than the threshold, Th, for channel quality. The channel is too good when $SI_w - Th > \epsilon$.

In accordance with the method for optimal dynamic channel allocation, channels are re-assigned through competition. The base station which has better usage of the channel will eventually have that channel assigned thereto. The key point of the strategy is the introduction of a waiting time Ti for monitoring channel i where $$T_i = T_s + t_i$$

where $T_s$ is a constant defined to be long enough so that the base station can discover if the channel i is in a locally heavy period and the quality of channel i can be properly measured, and $t_i$ is a measurement of the margin and importance of channel i to the associated base station j defined as $$t_i \propto \begin{cases} \dfrac{SI_w(i) - Th}{\text{traffic}(j)} & \text{if } SI_w(i) \geq Th \\ \infty & \text{otherwise} \end{cases}$$

where traffic(j) is the current traffic at site j.

The home base stations of channel i with too good quality of the channel are required to stop using channel i for at least $T_i$ seconds so that the other base stations may have the opportunity to make a measurement of the channel. The base station who has the best usage of the channel (i.e. has the smallest $t_i$) will seize the channel and become the new home base station.

In accordance with the alternate embodiment of the present invention, the handset 24 maintains a table in the memory 179 (FIG. 6) of base stations within the system to allow the controller 178 to find available channels as described below. The base station table contains a list of preferred sites organized in descending order of P(j) ≥ $P_t$, as measured by the controller 178 from the RSSI values of the base station's channels, where P(j) is the measured signal strength from base station j and $P_t$ is the acceptable threshold of signal strength. There may be only one entry in the table, or even no entries.

Figure 10:
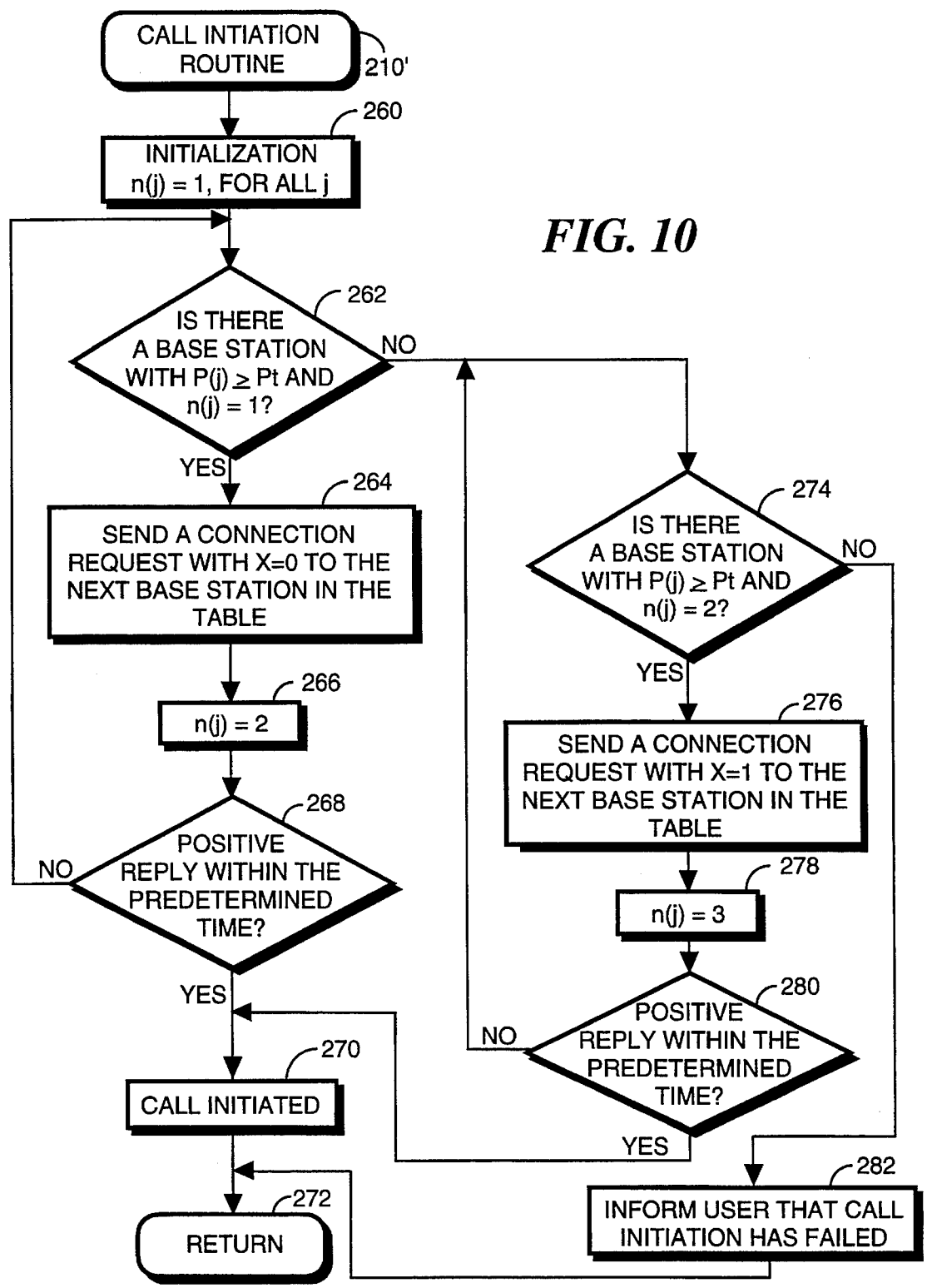

Referring to FIG. 10, a flow chart of the operation of the controller 178 of the handset 24 (FIG. 6) when setting up communication with a base station call handler 58 (FIG. 3) in accordance with the present invention is shown. The call handler 58 interfaces the controller 60 (FIG. 3) of the base station 21 with the handset 24. The operation of the controller 178 of the handset 24 (FIG. 6) in accordance with the alternate embodiment of the present invention operates as described above in reference to FIGS. 7 and 9. A "handover" during the call monitoring routine (FIG. 9) could alternatively be initiated if the channel quality, as measured by S/I becomes poor (i.e., S/I<Th). The call initiation routine 210', though, differs, as depicted in FIG. 10. The call initiation routine 210' begins by initializing an index n(j) for every base station in the base station table stored in the memory 179 (FIG. 6) to one 260. When the index n(j) of a base station j equals one, processing is examining the base station j for the first time; when the index n(j) equals two, the channel of the base station j have previously been examined.

After initialization of the indexes n(j) 260, the controller 178 examines the table in the memory 179. If there is a base station j with a channel having a signal power P(j) greater than or equal to the threshold signal power $P_t$ and the index n(j) equals one 262, a connection request is sent to the first such base station in the base station table 264, the connection request indicating that a variable x should be set to zero. When the variable x is set to zero, the base station attempts to allocate one of its assigned channels to the handset. If the variable x is set to one, the base station attempts to allocate one of its borrowed channels to the handset if no good enough assigned channel exists.

After the connection request is sent 264, the index n(j) for the base station j is set equal to two 266 and processing awaits reception of a reply 268. If the reply to the connection request is received within a predetermined time and is positive 268, the call is initiated 270 on the allocated channel and processing returns 272 to the idle loop 202, 204, 206 (FIG. 7) to await one of the calling task requests. A positive reply means there is at least one channel allocated in the reply that is acceptable for the handset. If the reply to the connection request is not positive or a reply is not received within the predetermined time 268, processing returns to step 262.

If there are no base stations j having P(j) greater than or equal to $P_t$ and an index n(j) equal to one 262, then the table stored in the memory 179 (FIG. 6) is examined to determine if there are any base stations j having P(j) greater than or equal to $P_t$ and an index n(j) equal to two 274. A connection request is then sent to the first such base station in the base station table 276, the connection request indicating that the variable x should be set to one. The index n(j) for the base station j is then set equal to three 278 and processing awaits reception of a reply 280. If the reply to the connection request is positive and received within a predetermined time 280, the call is initiated 270 on the allocated channel and processing returns 272 to the idle loop 202, 204, 206 (FIG. 7) to await one of the calling task requests. If the reply to the connection request is not positive or a reply is not received within the predetermined time 280, processing returns to step 274. In other words, after all of the base stations in the table (base stations with P less than $P_t$ are not included in the table) stored in the memory 179 have been sent a connection request once to allocate an assigned channel and no assigned channel is acceptable, the list is gone through again to send a connection request to the listed base stations to assign a borrowed channel.

If there are no base stations j having P(j) greater than or equal to $P_t$ and an index n(j) equal to two 274, the handset user is informed that the call initiation has failed 282, and processing returns 272 to the idle loop 202, 204, 206 (FIG. 7) to await one of the calling task requests. Call initiation failure occurs when either (a) there are no base stations with a channel power P greater than or equal to the threshold $P_t$ (i.e., the handset is out of range of any base stations), or (b) a positive reply has not been received from connection requests within the predetermined time to the base stations in the table for allocation of a channel assigned (x=0) to the base station or borrowed (x=1) by the base station. A call is established if at least one of the base stations in the list stored in the memory 179 has a free channel (if no assigned channels are available, borrowed channels are attempted to be allocated) with S/I≥Th as measured at both the base stations, as described below and the handsets. Otherwise the call is blocked.

Referring to FIGS. 11, 12, 13, and 14, the optimal dynamic channel allocation routine is described in accordance with the alternate embodiment of the present invention. The operation of the channel allocator 62 (FIG. 3) starts 300 with the startup of the base station. The channel allocator 62 determines whether a disconnect request has been received 302. If the channel allocator 62 receives a disconnect request 302, a disconnect routine 304 is performed, after which processing moves into an environment monitoring routine 306. If a connection request is received 308, a connect routine 310 is performed. Processing then returns to the environment monitoring routine 306. Otherwise, processing monitors the channel environment via the environment monitoring routine 306. Alternatively, a more efficient method for performing the channel allocation would be to implement the environment monitoring routine with interrupts for activation of the disconnect routine or the connect routine when a disconnect request interrupt or a connection request interrupt are received, respectively.

Figure 11:
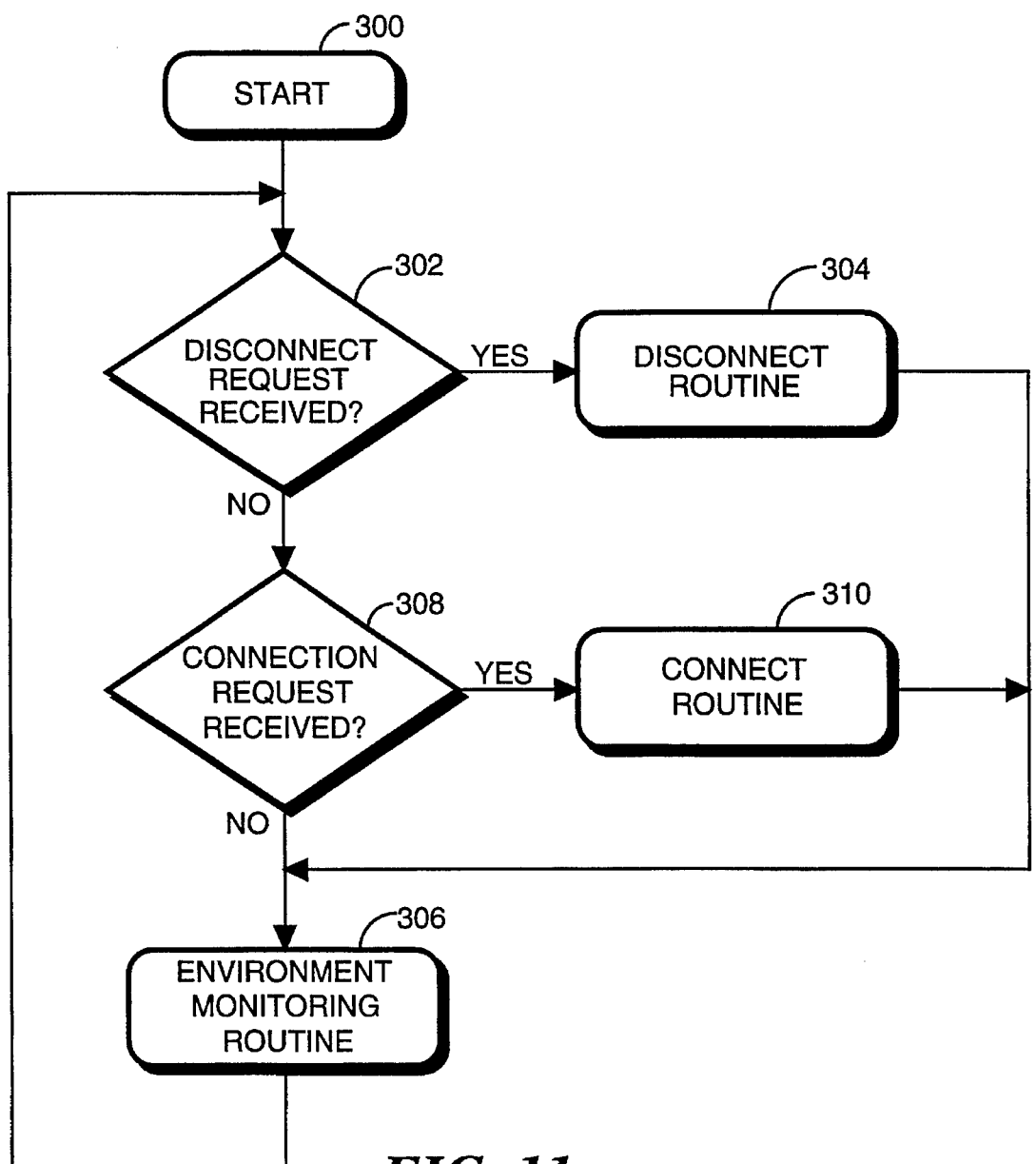
Figure 12:
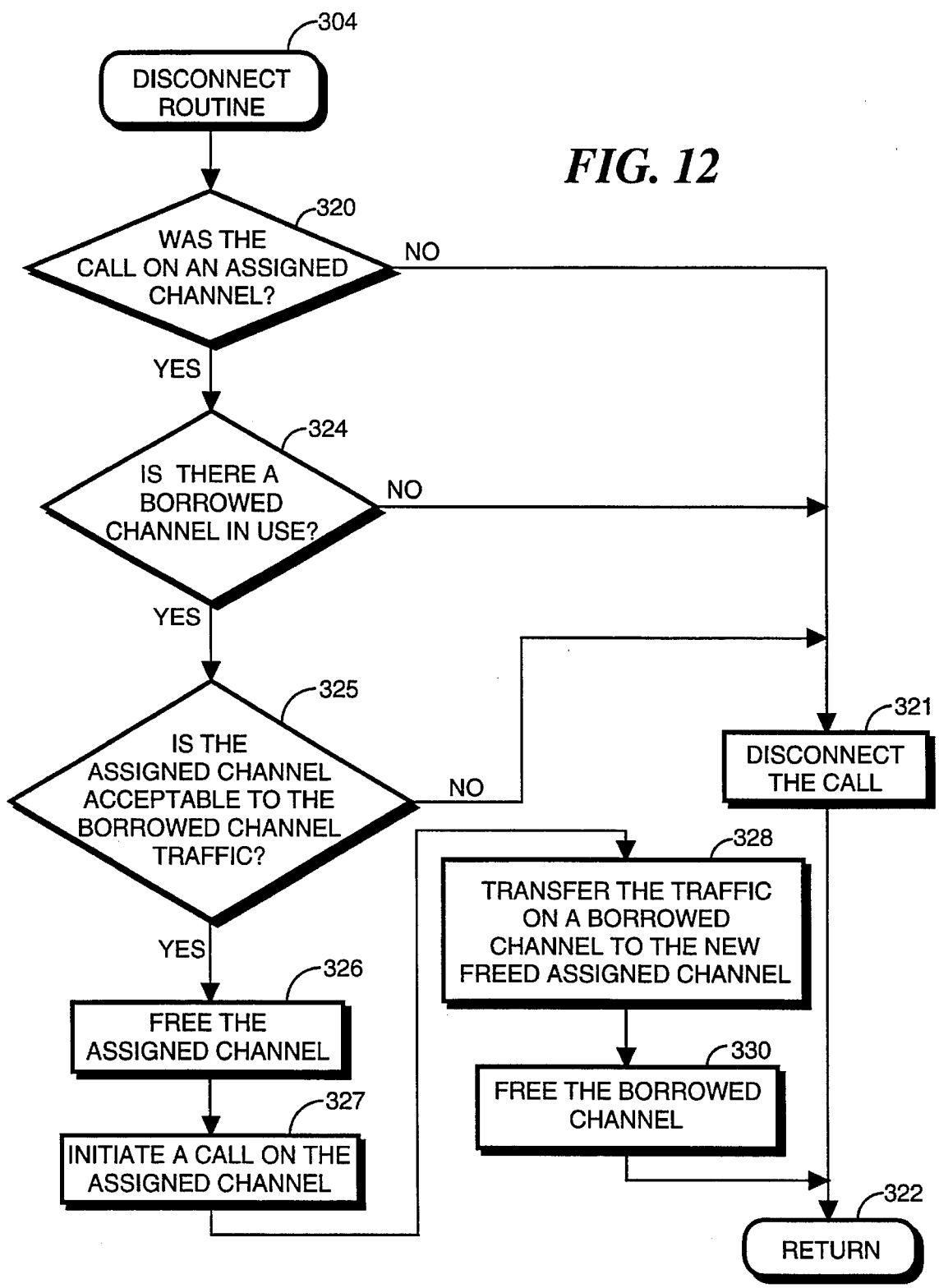

Referring to FIG. 12, the disconnect routine 304 first determines if the call to be disconnected was on an assigned channel 320. If the call was not on an assigned channel 320 (i.e., the call was on a borrowed channel), the call is disconnected 321 and processing returns 322 to monitor the environment 306 (FIG. 11).

If the call was on an assigned channel 320, it is determined whether a borrowed channel is in use 324. If no borrowed channels are in use, the call is disconnected 321 and processing returns 322 to monitor the environment 306 (FIG. 11). If a borrowed channel is in use 324, the assigned channel is examined to determine if the assigned channel is acceptable to the borrowed channel traffic 325. If the assigned channel is not acceptable to the borrowed channel traffic 325, the call is disconnected 321 and processing returns 322 to monitor the environment 306 (FIG. 11).

If the assigned channel is acceptable 325, the assigned channel is freed (i.e., the call on the assigned channel is disconnected) 326 and a new call is initiated on the assigned channel 327. In accordance with the present invention, a base station advantageously attempts to return a borrowed channel to its home base station as soon as possible. Thus after a call is finished on an assigned channel, the traffic on a borrowed channel will be transferred to the finished call channel if acceptable and the borrowed channel will be returned to its home base station. By returning the borrowed channels to their home base stations expeditiously, the present invention advantageously attempts to maintain an ideal environment among the base stations Which lend or borrow channels, and the communication traffic utilizes the assigned channels as far as possible. In accordance therewith, the traffic on one of the borrowed channels in use is transferred 328 to the newly freed assigned channel and the borrowed channel is freed 330. Processing then returns 322 to monitor the environment 306 (FIG. 11).

Figure 13:
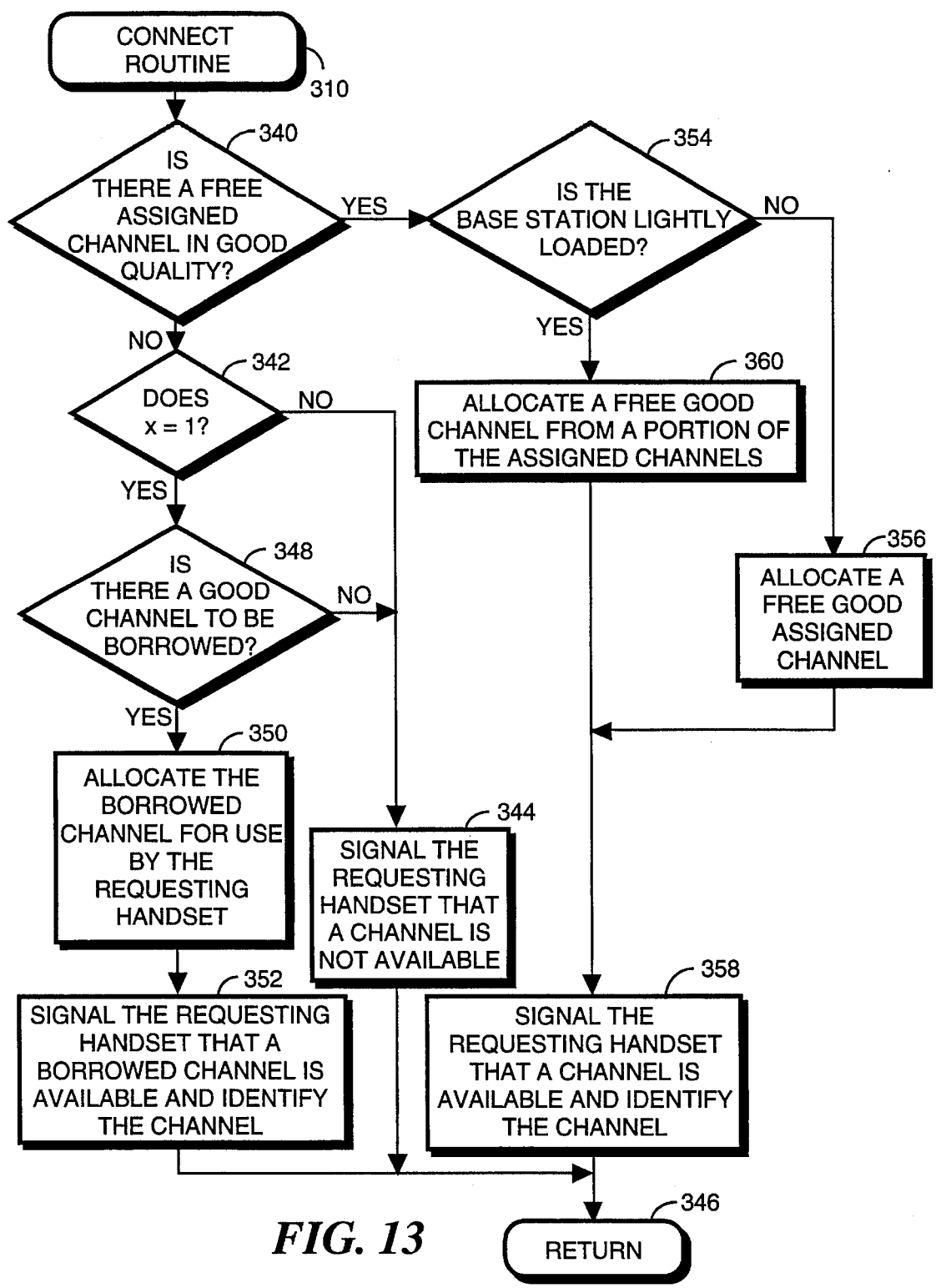

Referring to FIG. 13, the connect routine 310 begins by examining the channels assigned to the base station to determine if there is at least one free assigned channel in good quality 340. The assigned channels of a base station are always the first choices of traffic. If there is no free assigned channel in good quality 340, the value of x transmitted by the requesting handset is examined to see if x equals one 342. If x does not equal one 342, the handset is requesting an assigned channel of the base station. Thus, if there is no free assigned channels 340 and x does not equal one 342, the requesting handset is signalled that a channel is not available (i.e., a negative reply is sent to the handset requesting connection) 344. Processing then returns 346.

If x is equal to one 342, the channels are checked to see if there is a channel to be borrowed 348. A channel can be borrowed if the channel is not "assigned" to the base station but nevertheless has good measured channel quality at the base station and is not in a locally heavy loaded period. If there are no channels to be borrowed 348, the requesting handset is signalled that a channel is not available 344 and processing returns 346. If there is a channel to be borrowed 348, the borrowed channel is allocated for use by the requesting handset 350 and the requesting handset is signalled that a channel is available (i.e., a reply is sent to the handset requesting connection) and the borrowed channel is identified 352. Processing then returns 346 to monitor the environment 306 (FIG. 11).

If there is a free assigned channel 340, processing determines whether the base station is lightly loaded 354. If the base station is not lightly loaded 354, a free assigned channel in good quality is allocated 356 for use by the requesting handset and the handset is signalled that a channel is available, the allocated channel being identified thereto 358. Processing then returns 346. If the base station is lightly loaded 354, the channel allocator 62 (FIG. 3) attempts to use only a portion of the assigned channels by allocating a free channel in good quality from a designated portion of the assigned channels 360 (for example, the lower indexed channels). In this manner, a lightly loaded base station will try to use a portion of the assigned channels with S/I≧Th so that a busy adjacent base station can borrow the un-used channels. Yet an assigned channel should not be used too much. An un-used assigned channel i will not be used until at least one of the used assigned channels is being used too much. A channel is determined to be used too much if the spacing between successive busy period of the channel, $T_{spac}$, is less than τ. In other words, in light traffic the channel allocation method of the present invention tries to use a minimum number of channels assigned to it with all the used channels having S/I≧Th and $T_{spac}$≧τ.

The requesting handset is thereafter signalled that a channel (within the designated portion, if possible) is available, the allocated channel being identified thereto 358 and processing returning 346. As described above, the channel allocator 62 (FIG. 3) could alternatively allocate a list of available channels in decreasing preference from which the handset can choose an acceptable channel.

Figure 14:
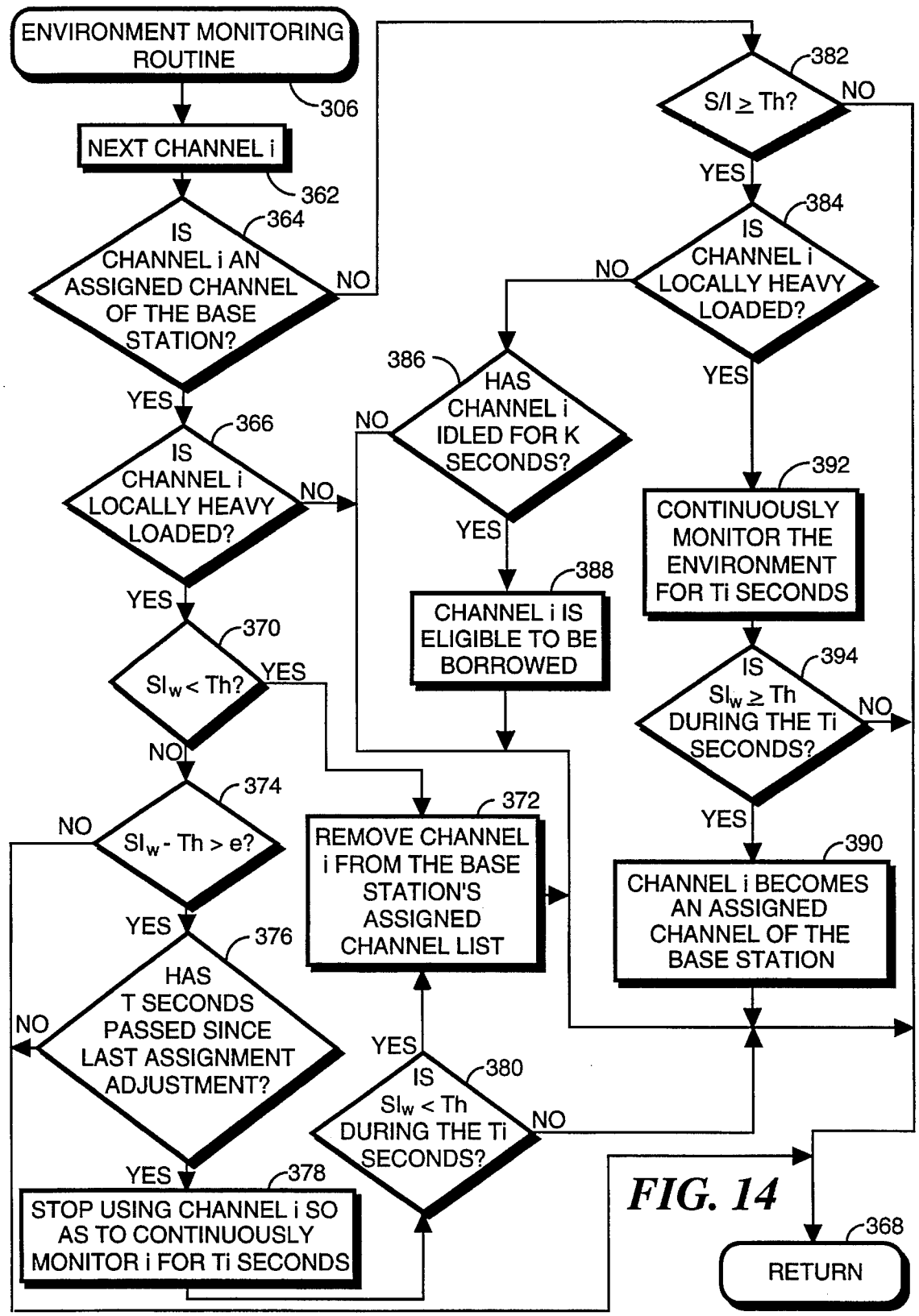

Referring to FIG. 14, the environment monitoring routine 306 sequentially monitors the channels of the radio communication system on each pass through the loop 302, 308, 306 (FIG. 11). In order to sequentially monitor the channels, the environment monitoring routine 306 initially increments a counter i to examine the next channel i 362. If channel i is an assigned channel of the base station 364, examination of channel i at the base station determines whether channel i is locally heavy loaded 366. As described above, a channel i is found to be in a locally heavy loaded period at a base station j if all the important interferences (i.e. first tier co-channel interferences) are busy.

If channel i is locally heavy loaded 366, a channel reassignment process takes place. The channel reassignment process adapts to the slowly changing environment and is realized by a channel assignment adjustment operation. The channel assignment adjustment operation will not be started unless the channel i is found in a locally heavy loaded period at the base station 66. If the channel is found not in a locally heavy loaded period any more 366, the channel assignment adjustment operation will stop and processing will return 368 to the loop 302, 308, 306 (FIG. 11).

The channel assignment adjustment operation first examines the quality of the channel 370. Site j will release channel i if the quality of the channel becomes poor ($SI_w$<Th) 370 by removing the channel i from the base station's assigned channel list 372. Processing then returns 368 to the loop 302, 308, 306 (FIG. 11).

If the quality of the channel is not poor 370, but is determined to be too good (i.e., $SI_w$−Th>ε) 374, the base station tries to release channel i so that another base station which has more efficient usage of channel i may be the new "home site" of channel i. First, the time since channel i was last tested is examined 376 to see if it is greater than a predetermined minimum time between channel assignment adjustments, T seconds. If T seconds has transpired 376 since the last assignment adjustment of channel i, use of channel i is terminated for $T_i$ seconds 378 to continuously monitor channel i for channel quality. As described above, $T_i=T_s+t_i$ where $T_s$ is a constant and $t_i$ is a measurement of the quality and importance of channel i to the base station. If the channel quality $SI_w$ falls below the threshold Th during the $T_i$ seconds of testing 380, the channel i is removed from the base station's assigned channel list 372 and processing returns 368 to the loop 302, 308, 306 (FIG. 11).

If the channel quality is not poor 374, T seconds has not passed since the last test of channel i 376, or the quality of channel i does not become poor during the test period 380, processing returns 368 to the loop 302, 308, 306 (FIG. 11) without removing channel i from the base station's assigned channel list.

If channel i is not an assigned channel of the base station 364, the base station can "borrow" channel i from another base station. If channel i is in good quality (S/I≧Th) 382, channel i is not in a locally heavy loaded period 384, and channel i has been idle for K seconds 386, then channel i may be "borrowed" by the base station 388. Processing then returns 368 to the loop 302, 308, 306 (FIG. 11). If channel i is in good quality (S/I≧Th) 382 but channel i is in a locally heavy loaded period 384, channel i can be reassigned to the base station if the channel is in good quality for at least $T_i$ seconds—i.e., channel i is monitored for $T_i$ seconds 392 and if the co-channel interference, $SI_w$, for channel i is greater than or equal to Th during the $T_i$ seconds 394, the channel i becomes an assigned channel of the base station 390. If the channel quality is not good (S/I<Th) 382, or channel i has not idled for K seconds 386 when channel i is not locally heavy loaded 384, or the co-channel interference is measured poor ($SI_w$<Th) 394 when channel i is heavy loaded 384, processing will return 368 to the loop 302, 308, 306 (FIG. 11) without "borrowing" or reassigning channel i.

The assigned channel list of each base station is maintained in the memory 64 of the base station 21 (FIG. 3). The determination of whether a channel i is in a locally heavy loaded period at the base station 21a (FIG. 2) requires knowledge of the co-channel locations. Therefore, the co-channel location information on each channel i is maintained at the node 26 or the central control 28 (FIG. 1). Thus, the optimal dynamic channel allocation method of the alternate embodiment of the present invention is not fully distributed because information necessary to determine the first tier co-channel interference is shared among the base stations.

By now it should be appreciated that there has been provided an apparatus for channel allocation and a preferred fully distributed dynamic channel method and an alternate optimal dynamic channel method of operation of the apparatus which combines the benefits of fixed channel allocation methods and dynamic channel allocation methods and is adaptive to the slowly changing environment while approaching the maximum system capacity with acceptable service quality for any environment.

II. A Second Embodiment of the Handset

FIGS. 15 through 20 show various aspects of an alternate embodiment for the handset of FIG. 6. Referring to FIG. 15, a channel matrix of the dynamic channel assignment system operates in accordance with the preferred embodiment of the present invention. The matrix has a number of radio frequency carriers, F1 through FN, upon which a plurality of base stations may communicate with the handset. Each frequency carries information which is time division multiplexed within a predetermined number of time slots, TS1 through TSM, each time slot repeats twice during a cycle. A time slot pair and a corresponding frequency define a channel for communication between the handset and the base station. During an outbound portion of the cycle, the time slot is for communication from the base station to the handset, and during the inbound portion of the cycle, the time slot is for communication from the handset to the base station. In the preferred embodiment of the DECT system, there are ten frequencies (N=10), each having twenty four time slot pairs (M=24), and the cycle repeats every 0.01 seconds.

The channels may be reused in differing areas. For example, a first base station may use TS1 and TS3 of F1 for communication with a first and second handset in a first area and a second base station may use TS1 and TSM of F1 for communication with a third and fourth handset in a second nearby area. Channel reuse in nearby areas (TS1, F1 in this example) allows for more handsets to be accommodated by the communication system.

Referring to TS1 of FN, the generalized structure of the information within a time slot is shown. The information contains a synchronization portion, 500, which includes bit and frame synchronization signals, and a digital information portion 502 which includes information codewords formatted with an error detecting code. The error correcting code is preferably a cyclic redundancy code such as a codeword having a 16 bit CRC which allows for detection of bit errors occurring in the transmission between the base station and the handset.

The digital information is modulated upon the radio frequency carrier using two level FM modulation. FIG. 16 shows an idealized eye pattern of two level FM modulation operating in accordance with the preferred embodiment of the present invention. The eye pattern represents an oscilloscope display of an accumulation of voltage traces of the a signal demodulated by receiver 174. A symbol communicates one binary bit, thus two distinct levels occur at the center of the symbol, line 510. The lowest voltage level represents the logic state of "0", the highest voltage represents a logic state of "1". Under conditions where there is little interference with the carrier frequency by either interfering signals or noise, the voltage levels at the center, line 510, of the eye will substantially correspond to the two voltage levels shown by 0, and 1. However, as the interference combines with the carrier frequency, the voltages at the center, line 510, of the eye degrade away from the levels 0 and 1, toward the threshold 514 which divides the two levels. Also, the voltage levels may exceed either the 0 or 1 voltages. This degradation is shown by four double headed errors along line 510. By measuring or sampling the voltage at the center of the eye and determining the difference between the sampled voltage and a closest level of the two levels, an amount of "eye closure", may be determined. The amount of eye closure corresponds to a level of interference with the carrier frequency by either noise or an interfering signal, and may be used to assign a value to the information signal quality. Alternate embodiments may use other modulation techniques such as 4 level FM, M-ary FSK, PSK, and QAM without departing from the scope of the concept of measurement of "eye closure".

In the first embodiment of Section I, the quality of the channel was determined by the handset in response to the received signal strength indication (RSSI). RSSI measures the power of the carrier frequency received by the handset. However, in an environment where there is channel reuse by nearby base stations, the RSSI may not give a reliable indication of the true quality of the channel. This is because the power of the carrier frequency of a desired base station may combine with the power of a carrier frequency of a nearby interfering base station. The combination results in a higher level RSSI, while resulting in a lower level of quality of the demodulation information due to the interference.

FIG. 17 shows a flow chart of a first method for determining channel quality. The method operates in microprocessor 178 and may be used by tasks within the microprocessor for determining the quality of a channel. At step 520, the method is invoked. At step 522, the RSSI from receiver 174 is measured and the signal of FIG. 16 is sampled and the "eye closure" for each symbol is determined. Step 524 cause the sampling of step 522 to continue for at least a portion of the channel. When the sampling of step 522 is complete, step 524 enables step 526 to determine the channel quality. The channel quality is analyzed by adding the average of the RSSI value and the average of the "eye closure" multiplied by a constant "K".

FIG. 18 shows a flow chart of a second method for determining signal quality. The method operates in microprocessor 178 and may be used by tasks within the microprocessor for determining the quality of a channel. At step 530, the method is invoked. At step 532, the RSSI from receiver 174 is measured and the number of bit errors of the digital information signal 502 is determined. Step 534 causes step 532 to continue receiving and measuring for the duration of the channel. When step 532 is complete, step 534 enables step 536 to determine the channel quality. The channel quality is determined by adding the average of the RSSI value and the average of bit errors multiplied by a constant "K".

FIGS. 17 and 18 shows that the channel quality signal generated by the method is a function of analyzing both the carrier frequency power and the quality of the information modulated upon the carrier frequency. The flowchart of FIG. 17 analyzes the "eye closure" as a measurement of the information quality, and the flowchart of FIG. 18 analyzes the bit error rate as a measurement of the information quality. The value "K" in steps 526 and 536 allows for scaling the information quality relative to the carrier signal quality. This allows the channel quality measurement to be adjusted to the expected environment of the handset. For example, in an environment where there is expected to be little channel interference from competing base stations, the value of K may be a small or a de minimis value, thereby making the channel quality predominantly a function of the carrier frequency power. However, in an environment where the channel interference from other base stations is expected to be great, the value of K can be increased to a desired level. The value may be increased linearly to such a point where the channel quality is predominantly a function of the information quality, and not carrier frequency power. By providing the value of "K", a communication system designer has more flexibility in designing the communication system. Thus, what is provided is a handset having an improved channel quality measurement and being capable of accounting for interfering channels.

In a variation of the embodiments of FIGS. 17 and 18, step 524 or 534 could limit the sampling of step to only a portion of a channel thereby enabling the receiver 174 to be switched off for the remainder of the channel. This would both conserve battery power of a battery (not shown) powering the handset and provides for a more rapid measurement of channel quality. Alternately, step 524 or 534 could continue the process of steps 522 and 532 for a multiple of occurrences of the channel, thereby providing a more stable time averaged value of channel quality.

Figure 19:
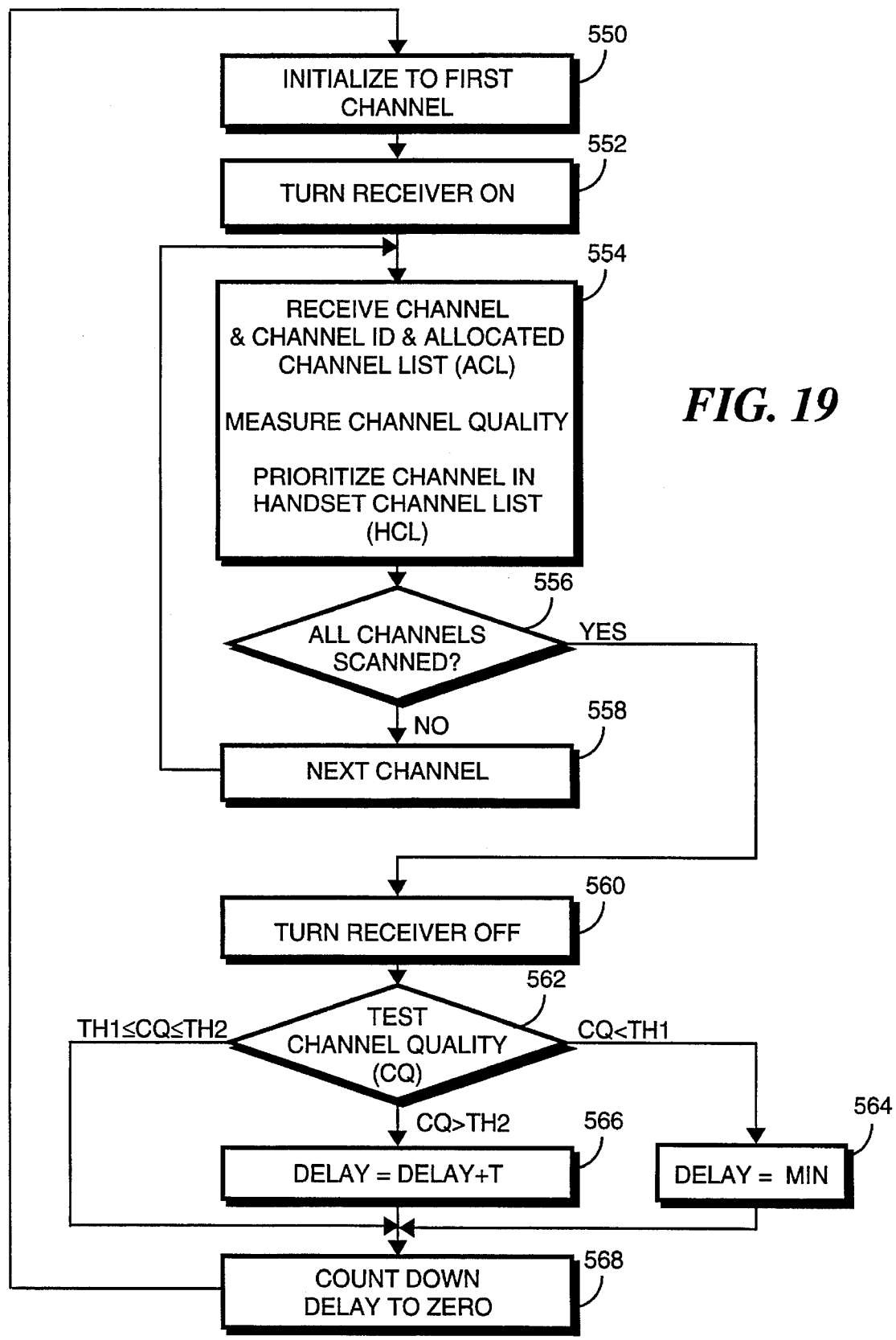

FIG. 19 shows a flowchart for reducing power consumption while for maintaining a handset channel list (HCL). Since the handset may have to initiate or receive a call at any time, a list of good quality channels must be continuously maintained by the handset. Since power is consumed from the battery powering the handset in maintaining the HCL, it is desirable to maintain the HCL while minimizing the power consumed by the handset so that the life of the battery may be extended.

The method of FIG. 19 is initialized to a first channel such as time slot 1 of F1 of FIG. 15 in step 550. Then in step 552 the receiver 174 is switched ON and power is thus consumed from the battery. Then in step 554, the channel is received and channel information is decoded and stored for later use in a memory location associated with the channel. The channel information includes a channel ID transmitted by the base station which indicates the system owner and/or location of the base station. Also included in the channel information is the base station's allocated channel list (ACL) of FIG. 5 step 140. Note that prior references in the first embodiment to the base station communicates the "PCL" to the handset should more appropriately indicate that the base station communicates the "ACL" to the handset, although in many cases, the PCL and the ACL may be substantially similar. Then in step 554, the channel quality is measured according to either FIG. 17, or FIG. 18, or any other method used for determining channel quality (such as RSSI only). Once the channel quality is determined, the channel is prioritized according to it quality and stored in the HCL contained in memory 179. In the HCL, the highest quality channel is given the highest priority and the lowest quality channel is given the lowest priority. If all channels are not scanned in step 556, then step 558 initializes for the next channel and step 554 is repeated. If all channels are scanned, then the receiver 174 is switched OFF at step 560, thereby conserving battery power. However, the receiver may remain ON if another task in the microcomputer 178 requires use of the receiver. Then step 562 analyzes the channel quality of the channels in the HCL. step 562 uses two channel quality thresholds, TH1 and TH2, wherein TH2 is greater than or equal to TH1. If no channel has a quality level above TH1, at step 562, then a minimum power conservation delay is set in step 564 which is preferably 0.01 seconds. However, if at least one channel is valid and has a channel quality level above TH2, then the battery saving delay is increased by a predetermined value T at step 566, the value of "T" being a multiple of 0.01 seconds. Note that a limit on a maximum delay may also be included in step 566 which would preferably be one second. If there is at least one channel having a quality between TH1 and TH2 at step 562, then the delay is left unchanged. Then step 568 delays (with the receiver OFF) for the amount of time from either step 564 or step 566. In alternate embodiments, the value T need not be constant, but may be a non linear value being a function of the current value of T and/or the number and/or quality of the scanned channels.

Thus, in a poor channel quality environment, all channels having a value below TH1, the handset scans the channels within a first (minimum) time interval and expends a maximum amount of energy scanning for high quality channels to update the HCL. However, if the channel quality improves beyond TH2, for reasons including either a reduction in the local traffic handled by the communication system, or the handset being moved closer to a base station, the scanning rate is adjusted by increasing the delay established by step 566. Since the delay is increased, over time less power is expended maintaining the HCL and battery power is conserved. But, if the handset is again operating in an environment where the quality of all channels is less than TH2 but greater than TH1, the scanning remains unchanged.

Finally, if the channel quality falls below TH1, the delay returns to the minimum, step 564, and the maximum amount of energy is expended in scanning for high quality channels.

Further, in the preferred embodiment, after a first full scan of all of the channels, additional battery saving (not shown) may be realized within the operation of steps 554, 556 and 558 by battery saving during the occurance of channels which been determined to have very low quality, or the channel ID is invalid because it does not match a channel, system ID or location assigned to the handset. In this way, only high quality valid channels are scanned and power is conserved during the occurrence of low quality or invalid channels. As the quality of the scanned high quality channel drops, a full scan may again be performed.

Figure 20:
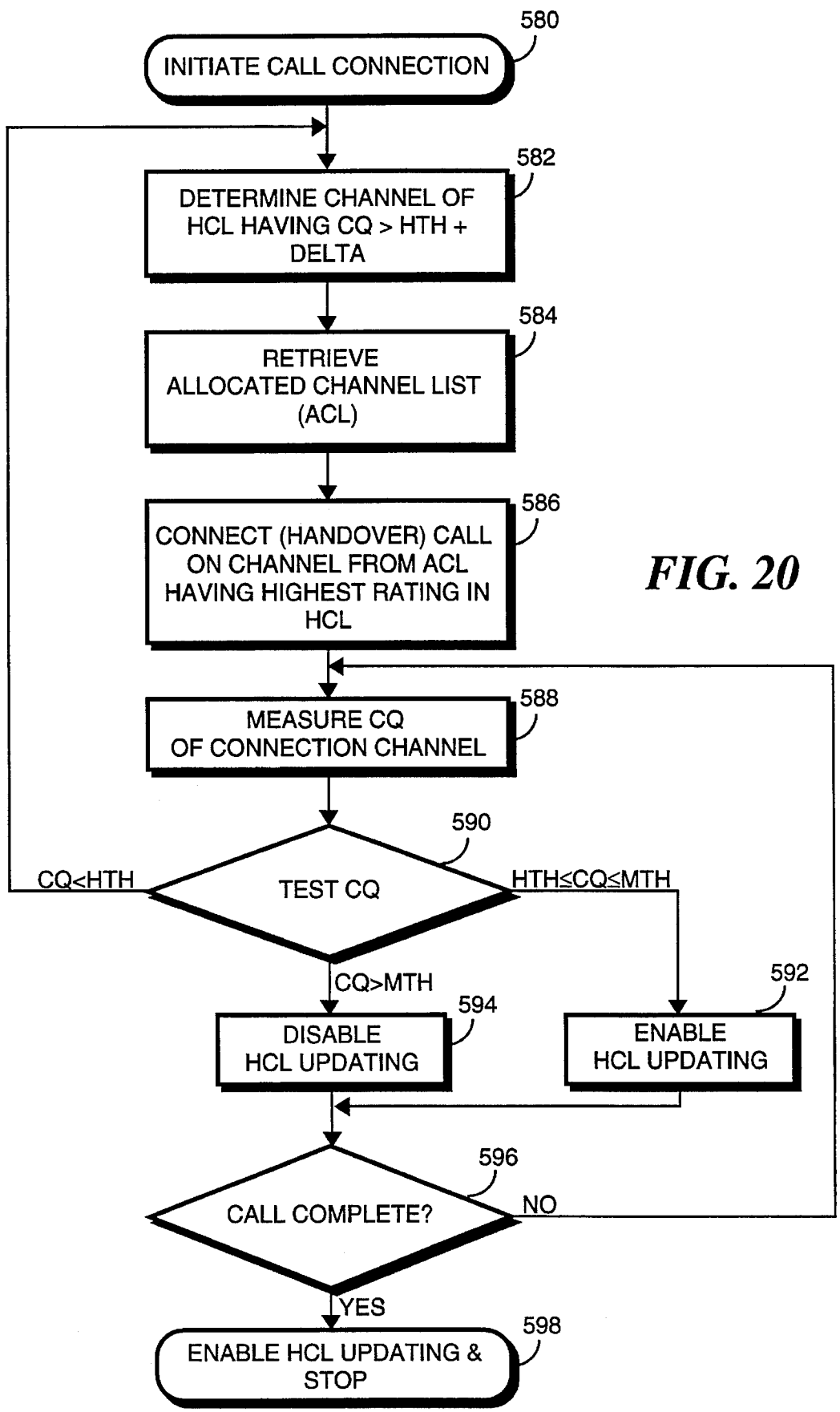

FIG. 20 shows a flow chart of a handset initiating a call and maintaining the call during a handover environment. A signal to initiate a call is accepted in step 580. Then in step 582, the handset determines which channel has the highest quality on the HCL of FIG. 19 and a channel quality greater than a predetermined handover threshold (HTH) plus a constant delta, step 582. If no channel has a quality greater, then an out of range indication may be sent to the user of the handset. In response to selecting a channel, in step 584, the handset retrieves from memory the ACL associated with the channel. The ACL having been previously received in step 554. After receiving the ACL, the handset then selects an optimum channel from the ACL for communication with the base station, step 586. Determination of an optimum channel may be either by selecting prioritized ACL channel from the base station, or (preferably) selecting a first ACL channel having a weak RSSI measurement, thereby indicating no interfering sources near the handset, or selecting an ACL channel in response to the handset's own HCL. Either of these methods assures a high quality channel connection because, the handset first selects the highest quality base station. The base station having already sent the handset a list of its determination of the highest quality available channels. The handset then may select from the base station's list a channel which it also determines to be a high quality channel.

While the call information is communicated between the base station and the handset, the handset monitors the channel quality of its connection with the base station, step 588. Step 590 then analyzes the channel quality which may include the methods of either FIGS. 16 or 17. As long as the channel quality (CQ) is greater than a predetermined handover threshold (HTH) and lower than a measurement threshold (MTH), the program continues monitoring the channel quality until the call is complete, steps 590, 592 and 596. Note that during this interval the task of updating the HCL of FIG. 19 concurrently runs. However, if the channel quality is greater than the measurement threshold, then additional power may be conserved during the call by inhibiting the power consumed in the task of updating the HCL, step 594. If the channel quality falls below the handover threshold for reasons which may include channel interference by another base station or the handset being moved farther away from the base station, then step 590 causes the program to return to the process of step 582, where another channel (and potentially another base station) is selected. Note that the handover process of changing from a current channel to a new channel for the handset occurs in the re-execution of step 586.

Use of the dual threshold in FIG. 20 has several advantages. First, since the handover threshold is lower than the handover threshold plus delta, once a handset establishes communication with the base station, the signal quality will have to degrade by the predetermined delta before a handover is initiated. This allows a handset to communicate longer with a base station without a handover to another channel. The dual thresholds aspect reduces the amount of handovers. Providing a method for reducing the amount of handovers is advantageous because, if every handset in the communication system were constantly searching for a channel having the highest quality, there would be a significant amount of handovers. The amount of data communication necessary to complete the handovers would load the system down with handover data and decrease the capacity and profitability of the system.

Furthermore, the value of each of the dual thresholds may be set by the system designer, in combination with all other thresholds described above. Since the designer balances the base station coverage area with the amount of handovers in the system, providing both thresholds facilitates a better balancing according to the needs of the system. If handsets are allowed to move too far from a base station, either the channel interference from nearby base stations may be excessive thereby reducing the quality of the call, or the channels must be prohibited from use by nearby base stations, thereby reducing channel reuse and reducing system capacity. These factors are also balanced against a desire to minimize the amount of handovers which also reduce the system capacity.

Thus, what is provided is a way to improve the channel quality measurement made by the handset. Also what is provided is a method of improving the battery life of the handset while scanning. What is also provided is a method for regulating the amount of handovers occurring within the system. What is further provided is a method which allows for establishing a high quality channel between the base station and the handset, wherein both the handset and the base station make individual determinations on the quality of the channel and the resulting channel is a combination of the individual determinations.

What is claimed is:

1. A method of determining a quality level of a communication channel having an information signal modulated upon a radio frequency carrier, the method comprising the steps of:

(a) receiving the radio frequency carrier;

(b) determining a received signal quality level of the radio frequency carrier;

(c) demodulating the information signal;

(d) determining an information quality level of the information signal;

(e) analyzing the received signal quality level and the information quality level comprising:
   multiplying the information quality level by a predetermined constant to produce a weighted information quality level; and
   adding the received signal quality level to the weighted information quality level; and (f) generating a channel quality level signal in response to said step of adding.

2. The method of claim 1 wherein the step (b) of determining further includes the steps of:

(b1) measuring a level of radio frequency energy received during said step (a) of receiving;

(b2) assigning a value to the received signal quality level in proportion to said step (b1) of measuring.

3. The method according to claim 2 wherein the received signal quality level corresponds to a received signal strength indicator.

4. The method according to claim 1 wherein the information signal includes a plurality of digital symbols, each of the plurality of digital symbols representing at least a first and a second binary state, the first binary state being represented by a first predetermined voltage, and the second binary state being represented by a second predetermined voltage, wherein said step (d) of determining determines the information quality level by:

(d1) measuring a symbol voltage of a received symbol of the plurality of symbols to more closely correspond to the first predetermined voltage than the second predetermined voltage;

(d2) determining a difference between the symbol voltage and the first predetermined voltage; and (d3) assigning a value to the information quality level in proportion to said determination of said step (d2) of determining.

5. The method according to claim 1 wherein the information signal includes digital data comprising at least one codeword formatted with an error detecting code for detecting up to a predetermined number of errors in the codeword, and said step (d) of determining further includes the steps of:

(d3) processing a received codeword and generating an error signal indicative of a number of errors detected by the error detecting code; and (d4) assigning a value to the information quality level in proportion to the error signal of said step (d3) of processing.

6. The method according to claim 5 wherein the error detecting code is a cyclic redundancy code.

7. The method according to claim 1 further comprising the steps of:

(g) setting the predetermined constant to a de minimis value if the radio frequency carrier is expected to be received with substantially no radio frequency interference; and (h) increasing the predetermined constant in proportion to any expected radio frequency interference.

8. The method according to claim 1 wherein the communication channel is a first communication channel of a plurality of communication channels, and the method further comprises the steps of:

performing said steps (a) through (f) on the first communication channel to produce produce a first channel quality level signal;

storing the first channel quality level signal along with a signal indicative of the first channel in a first position in a channel list;

performing said steps (a) through (f) on a second communication channel of the plurality of communication channels to produce produce a second channel quality level signal;

storing the second channel quality level signal along with a signal indicative of the second channel in a second position in the channel list, wherein the first position has a higher priority than the second position if the first channel quality level signal is greater than the second channel quality signal, and the first position has a lower priority than the second position if the first channel quality level signal is less than the second channel quality signal.

9. A portable handset for determining a quality level of a communication channel having an information signal modulated upon a radio frequency carrier for communication between the handset and a base station, the handset comprising:

a receiver for receiving the radio frequency carrier and for generating a received signal strength level indicative of a received signal quality level of the radio frequency carrier, said receiver for further demodulating the information signal; and a controller for determining an information quality level of the information signal, analyzing the received signal strength level and the information quality level by multiplying the information quality level by a predetermined constant to produce a weighted information quality level and adding the received signal strength level to the weighted information quality level, and generating a channel quality level signal in response thereto.

10. The portable handset of claim 9, wherein the controller sets the predetermined constant to a de minimis value if the radio frequency carrier is expected to be received with substantially no radio frequency interference, and increases the predetermined constant in proportion to any expected radio frequency interference.

11. The portable handset of claim 9, wherein the controller multiplies an average of the information quality level by the predetermined constant and adds the weighted information quality level to an average of the received signal strength level.

12. The method of claim 1, wherein the step of multiplying comprises multiplying an average of the information quality level by the predetermined constant to produce the weighted information quality level, and the step of adding comprises adding an average of the received signal quality level to the weighted information quality level.

* * * * *

UNITED STATES PATENT AND TRADEMARK OFFICE
CERTIFICATE OF CORRECTION

PATENT NO. : 5,471,671
DATED : November 28, 1995
INVENTOR(S) : Wang et al.

It is certified that error appears in the above-indentified patent and that said Letters Patent is hereby corrected as shown below:

Title Page

Item [54] and Column 1, line 1,
   Please replace "HANSET" with --HANDSET--.

Claim 8

In column 23, line 46, please delete the second occurrence of the word "produce".

In column 24, line 2, please delete the second occurrence of the word "produce".

Signed and Sealed this

First Day of April, 1997

Attest:

BRUCE LEHMAN

*Attesting Officer*    *Commissioner of Patents and Trademarks*